(12) United States Patent
Sato

(10) Patent No.: US 11,788,585 B2
(45) Date of Patent: Oct. 17, 2023

(54) ROTATION TRANSMISSION DEVICE AND STEERING DEVICE FOR A VEHICLE

(71) Applicant: NTN Corporation, Osaka (JP)

(72) Inventor: Koji Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 7 days.

(21) Appl. No.: 17/627,432

(22) PCT Filed: Jul. 15, 2020

(86) PCT No.: PCT/JP2020/027498
§ 371 (c)(1),
(2) Date: Jan. 14, 2022

(87) PCT Pub. No.: WO2021/010419
PCT Pub. Date: Jan. 21, 2021

(65) Prior Publication Data
US 2022/0260121 A1  Aug. 18, 2022

(30) Foreign Application Priority Data

Jul. 18, 2019  (JP) .................................. 2019-132762

(51) Int. Cl.
*F16D 41/08* (2006.01)
*F16D 27/108* (2006.01)
(Continued)

(52) U.S. Cl.
CPC ......... *F16D 41/088* (2013.01); *F16D 27/108* (2013.01); *F16J 15/3232* (2013.01); *F16D 2023/123* (2013.01)

(58) Field of Classification Search
CPC ... F16D 41/066–105; F16D 27/10–118; F16D 2023/123; F16J 15/3204–3264
See application file for complete search history.

(56) References Cited

U.S. PATENT DOCUMENTS

| | | | |
|---|---|---|---|
| 2002/0125095 A1* | 9/2002 | Ochab | F16D 25/08 192/48.8 |
| 2012/0190493 A1* | 7/2012 | Tamoto | F16D 27/115 192/85.01 |

(Continued)

FOREIGN PATENT DOCUMENTS

| | | |
|---|---|---|
| EP | 2 833 014 | 2/2015 |
| EP | 3 124 357 | 2/2017 |

(Continued)

OTHER PUBLICATIONS

Extended Emopean Search Report dated Aug. 1, 2022 in corresponding Emopean Patent Application No. 20840143.0.

(Continued)

*Primary Examiner* — David R Morris
(74) *Attorney, Agent, or Firm* — Wenderoth, Lind & Ponack, L.L.P.

(57) ABSTRACT

A rotation transmission device is provided which includes rollers disposed between the inner periphery of an outer ring and the outer periphery of an inner ring; an armature supported to axially move when an electromagnet is energized; and a ball ramp mechanism which converts the axial movement of the armature into the motion/movement of a roller cage from an engaged position to a disengaged position. This rotation transmission device further incudes an annular cover member made of aluminum, an O-ring and an oil seal.

17 Claims, 16 Drawing Sheets

(51) Int. Cl.
*F16J 15/3232* (2016.01)
*F16D 23/12* (2006.01)

(56) References Cited

U.S. PATENT DOCUMENTS

2015/0075936 A1  3/2015  Akiyoshi et al.
2021/0071722 A1  3/2021  Sato et al.

FOREIGN PATENT DOCUMENTS

| | | |
|---|---|---|
| JP | 2002-195300 | 7/2002 |
| JP | 2007-64465 | 3/2007 |
| JP | 2014-25483 | 2/2014 |
| JP | 2016-109251 | 6/2016 |
| JP | 6491404 | 3/2019 |
| WO | 2019/004383 | 1/2019 |
| WO | 2019/135383 | 7/2019 |

OTHER PUBLICATIONS

International Search Report dated Sep. 24, 2020 in International (PCT) Application No. PCT/JP2020/027498.
English translation of International Preliminary Report on Patentability and Written Opinion dated Jan. 18, 2022 in International (PCT) Application No. PCT/JP2020/027498.

* cited by examiner

ROTATION TRANSMISSION DEVICE AND STEERING DEVICE FOR A VEHICLE

TECHNICAL FIELD

The present invention relates to a rotation transmission device used to selectively allow and prevent the transmission of rotation, and a steering device for a vehicle in which the rotation transmission device is used.

BACKGROUND ART

Known rotation transmission devices used to selectively allow and prevent the transmission of rotation from an input shaft to an output shaft include, for example, a rotation transmission device disclosed in Japanese Unexamined Patent Application Publication No. 2014-025483 (hereinafter the JP '483 publication).

The rotation transmission device of the JP '483 publication includes a tubular case having openings at both ends thereof; an input shaft having one end thereof received in the case; an output shaft aligned with the input shaft in a straight line, with one end thereof received in the case; an inner ring disposed on the portion of the input shaft received in the case; an outer ring connected to the portion of the output shaft received in the case so as to rotate in unison with the output shaft; pairs of rollers disposed between a cylindrical surface on the inner periphery of the outer ring and respective cam surfaces on the outer periphery of the inner ring; and a roller cage retaining the pairs of rollers.

The roller cage is constituted by two split cage portions supported for rotation relative to each other. The two split cage portions are movable between (i) the engaged position in which the pairs of rollers are engaged with the cylindrical surface on the inner periphery of the outer ring and the respective cam surfaces on the outer periphery of the inner ring and (ii) the disengaged position in which the pairs of rollers are disengaged therefrom.

The case of the rotation transmission device is a seamless integral member having a tubular shape and comprising a cylindrical large-diameter tubular portion; a cylindrical small-diameter tubular portion having an inner diameter smaller than the inner dimeter of the large-diameter tubular portion; and a coupling portion coupling the large-dimeter tubular portion and the small-diameter tubular portion to each other.

The rotation transmission device includes, between the inner periphery of the large-diameter tubular portion and the outer periphery of the input shaft, an annular electromagnet; an armature supported to axially move when the electromagnet is energized; and a ball ramp mechanism which converts the axial movement of the armature into motions of the two split cage portions from the engaged position to the disengaged position.

When mounting the above rotation transmission device to an automobile, the device is conventionally often mounted at a location where foreign matter such as muddy water is less likely to adhere (e.g., the central position of a steering shaft which transmits steering force from a steering wheel to the rack for vehicle steering).

However, the inventor of the present application considered directly mounting the above rotation transmission device at a position where foreign matter such as muddy water may adhere (e.g., a rack housing in which a rack for vehicle steering is received; the rack housing is exposed to the underside of the vehicle). Then, the inventor altered the design of the rotation transmission device such that the open end of the large-diameter tubular portion of the case is completely closed so that, when foreign matter such as muddy water adheres to the rotation transmission device, the foreign matter is prevented from entering the rotation transmission device, and the inventor evaluated the altered design.

As a result, it turned out that, when the open end of the large-diameter tubular portion of the case of the rotation transmission device is completely closed, the motion of the rotation transmission device may become unstable. In particular, it turned out that, when, in the rotation transmission device, the open end of the large-diameter tubular portion of the case is completely closed, heat tends to get trapped within the case, and the temperature of the electromagnet disposed within the case tends to rise. Since, if the temperature of the electromagnet rises too high, the force attracting the armature when the electromagnet is energized decreases, the roller cage may not be able to move, when the electromagnet is energized, from the engaged position to the disengaged position, so that the motion of the rotation transmission device may become unstable.

It is an object of the present invention to provide a rotation transmission device which stably operates in an environment where foreign matter such as muddy water may adhere to the device.

SUMMARY OF THE INVENTION

In order to achieve the above object, the present invention provides a rotation transmission device comprising: a tubular case including, as a seamless integral member, a cylindrical large-diameter tubular portion, a cylindrical small-diameter tubular portion having an inner diameter smaller than an inner dimeter of the large-diameter tubular portion, and a coupling portion coupling the large-dimeter tubular portion and the small-diameter tubular portion to each other; wherein one of two opposite ends of the large-diameter tubular portion that is remote from the small-diameter tubular portion is an open end, and one of two opposite ends of the small-diameter tubular portion that is remote from the large-diameter tubular portion is an open end, an input shaft having one end thereof received in the case, and the other end thereof protruding beyond the open end of the large-diameter tubular portion of the case; an output shaft aligned with the input shaft in a straight line, with one end of the output shaft received in the case, and the other end of the output shaft protruding beyond the open end of the small-diameter tubular portion of the case; an inner ring disposed on a portion of the input shaft received in the case so as to rotate in unison with the input shaft; an annular outer ring connected to a portion of the output shaft received in the case so as to rotate in unison with the output shaft, such that the annular outer ring surrounds the inner ring; engagement elements disposed between an inner periphery of the outer ring and an outer periphery of the inner ring; an engagement element cage supported for movement between an engaged position where the engagement elements are engaged with the outer ring and the inner ring and a disengaged position where the engagement elements are disengaged therefrom; an annular electromagnet mounted between an inner periphery of the large-diameter tubular portion and an outer periphery of the input shaft; an armature supported to axially move when the electromagnet is energized; a motion converting mechanism configured to convert axial movement of the armature into a motion of the engagement element cage from one position of the engaged position and the disengaged position to the other position; an input shaft bearing rotatably supporting the input shaft; and an output shaft bearing rotatably supporting the input shaft, characterized in that the rotation transmission device further comprises: an output shaft seal member that provides a seal between an outer periphery of the output shaft and an inner periphery of the open end of the small-diameter tubular portion; an annular cover member made of aluminum, and fitted to an inner periphery of the open end of the large-diameter tubular portion so as to be axially opposed to the electromagnet; an outer seal member that provides a seal between an outer periphery of the cover member and the inner periphery of the large-diameter tubular portion; and an inner seal member that provides a seal between an inner periphery of the cover member and the outer periphery of the input shaft.

With this arrangement, since the output shaft seal member provides a seal between the outer periphery of the output shaft and the inner periphery of the open end of the small-diameter tubular portion of the case, and the cover member, the outer seal member and the inner seal member provide a seal between the outer periphery of the input shaft and the inner periphery of the open end of the large-diameter tubular portion of the case, even if the device is used in an environment where foreign matter such as muddy water may adhere to the device, it is possible to prevent such foreign matter from entering the rotation transmission device. Also, since the cover member is mounted to be axially opposed to the electromagnet, and also is formed of aluminum, which has excellent thermal conductivity, it is possible to effectively prevent a rise in the temperature of the electromagnet disposed within the case, and thus to prevent a reduction in the force of the electromagnet attracting the armature due to a rise in the temperature of the electromagnet. In addition, since aluminum is a non-magnetic material, it is possible to prevent the magnetic flux generated from the electromagnet from being absorbed by the cover member, and thus to prevent a reduction in the attracting force of the electromagnet due to magnetic flux leakage.

If the electromagnet includes an annular field core made of a magnetic material, and fitted to the inner periphery of the large-diameter tubular portion; and a solenoid coil wound around the field core, it is preferable that the cover member is mounted to axially abut against the field core, and that the input shaft bearing is mounted to the inner periphery of the cover member so as to be kept out of contact with the field core.

With this arrangement, since the input shaft bearing is disposed on the inner periphery of the cover member made of aluminum, a non-magnetic material, so as to be kept out of contact with the field core of the electromagnet, it is possible to prevent the magnetic flux generated from the electromagnet from leaking to the input shaft via the input shaft bearing, and thus to improve the force of the electromagnet attracting the armature.

By forming, on the inner periphery of the cover member, a cylindrical, bearing fitting surface to which the input shaft bearing is fitted, and by setting an axial length of the bearing fitting surface larger than an axial width of the input shaft bearing, it is possible to keep the input shaft out of contact with the field core.

With this arrangement, since the bearing fitting surface has an axial length larger than the axial width of the input shaft bearing, it is possible to reliably prevent the input shaft bearing from coming into contact with the field core.

The inner seal member is preferably an oil seal including an annular metal core comprising a metal plate; and a seal lip made of rubber, and bonded to the metal core, the seal lip being in sliding contact with the outer periphery of the input shaft.

By using such an oil seal, it is possible to reliably prevent foreign matter such as muddy water from entering the rotation transmission device through a space between the input shaft and the cover member which rotate relative to each other.

The outer seal member is preferably an O-ring made of rubber.

By using such an O-ring, it is possible to seal, at a low cost, between the open end of the case and the cover member, which do not rotate relative to each other.

If one of the cover member and the large-diameter tubular portion has a through hole through which a lead wire configured to supply electric power to the electromagnet is inserted, a grommet made of rubber is preferably fitted in the through hole so as to provide a seal between an inner periphery of the through hole and an outer periphery of the lead wire.

With this arrangement, it is possible to reliably prevent foreign matter such as muddy water from entering the rotation transmission device through the through hole through which the lead wire is inserted.

The rotation transmission device preferably further comprises a dust cover including: an inner tubular portion fitted, with interference, to an outer periphery of a portion of the input shaft protruding beyond the case; a flange portion extending radially outwardly from one end of the inner tubular portion, and covering the open end of the large-diameter tubular portion of the case; and a cylindrical skirt portion extending axially from an outer periphery of the flange portion along an outer periphery of the large-diameter tubular portion.

With this arrangement, when using the rotation transmission device with the large-diameter tubular portion of the case located on the upper side, and with the small-diameter tubular portion of the case located on the lower side, since the upper surface of the cover member fitted to the open end of the large-diameter tubular portion of the case is covered by the dust cover, it is possible to prevent foreign matter such as muddy water from accumulating near the outer seal member on the outer periphery of the cover member, and the inner seal member on the inner periphery of the cover member. Therefore, it is possible to more effectively prevent foreign matter from entering the rotation transmission device.

The present invention also provides a steering device for a vehicle, the steering device comprising: a rack supported to be movable to left and right, and having both ends thereof connected to a pair of steered wheels, respectively, such that directions of the steered wheels change as the rack moves either to the left or to the right; a rack housing in which the rack is movably received; a pinion meshing with the rack; and the above rotation transmission device, wherein the case of the above rotation transmission device is detachably fixed to the rack housing, wherein the pinion is rotatably supported by at least one pinion support bearing mounted in the rack housing, and wherein an anti-rotation fitting portion is disposed between the output shaft of the rotation transmission device and the pinion such that the case is detachable from the rack housing by separating the output shaft from the pinion, and such that, with the case attached to the rack housing, the output shaft is rotatable in unison with the pinion.

With this arrangement, since the pinion and the output shaft of the rotation transmission device are formed separately from each other, assemblability is excellent, specifically, after separately assembling the rack housing, the rack and the pinion, and assembling the components of the rotation transmission device, it is possible to mount the rotation transmission device to the rack housing.

The rack housing preferably has a cylindrical positioning fitting surface to which a cylindrical surface formed on an outer periphery of the small-diameter tubular portion of the case is fitted.

By forming such a fitting surface, when mounting the rotation transmission device to the rack housing, it is possible to easily prevent the displacement of the center axes of the pinion and the output shaft.

The steering device preferably further comprises an O-ring that provides a seal between the positioning fitting surface and the cylindrical surface on the outer periphery of the small-diameter tubular portion.

By using such an O-ring, after mounting the rotation transmission device to the rack housing, it is possible to effectively prevent foreign matter such as muddy water from entering the rack housing through a gap between the rack housing and the small-diameter tubular portion of the case of the rotation transmission device.

The at least one pinion support bearing preferably comprises a plurality of pinion support bearings mounted to the rack housing, with at least one of the plurality of pinon support bearings located on each of two sides of the pinion between which a meshing portion of the pinion meshing with the rack is located, so as to support the pinion on the two sides.

With this arrangement, the pinion is stably supported, and thus meshes with the rack with high accuracy.

The at least one of the plurality of pinion support bearings located on one of the two sides that is closer to the rotation transmission device than is the meshing portion of the pinion may be fixed in position by being axially sandwiched between the rack housing and the small-diameter tubular portion of the case of the rotation transmission device.

With this arrangement, the pinion support bearing is prevented from becoming unstable in the axial direction, and thus the pinion meshes with the rack with higher accuracy.

Effects of the Invention

In the rotation transmission device of the present invention, since the output shaft seal member provides a seal between the outer periphery of the output shaft and the inner periphery of the open end of the small-diameter tubular portion of the case, and the cover member, the outer seal member and the inner seal member provide a seal between the outer periphery of the input shaft and the inner periphery of the open end of the large-diameter tubular portion of the case, even if the device is used in an environment where foreign matter such as muddy water may adhere to the device, it is possible to prevent such foreign matter from entering the rotation transmission device. Also, since the cover member is mounted to be axially opposed to the electromagnet, and also is formed of aluminum, which has excellent thermal conductivity, it is possible to effectively prevent a rise in the temperature of the electromagnet disposed within the case, and thus to prevent a reduction in the force of the electromagnet attracting the armature due to a rise in the temperature of the electromagnet. In addition, since aluminum is a non-magnetic material, it is possible to prevent the magnetic flux generated from the electromagnet from being absorbed by the cover member, and thus to prevent a reduction in the attracting force of the electromagnet due to magnetic flux leakage.

DETAILED DESCRIPTION OF THE INVENTION

Figure 1:
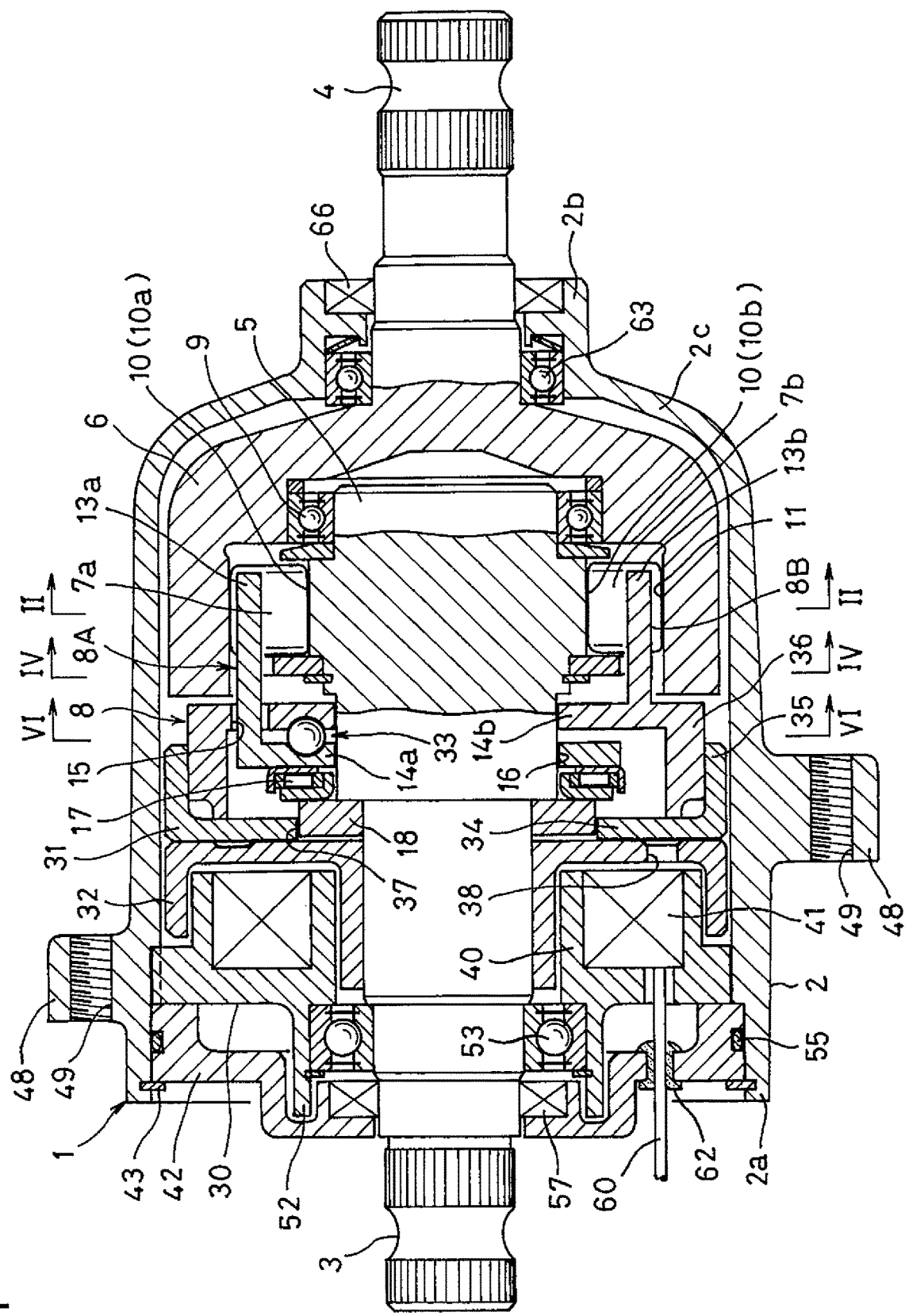
FIG. 1 is a sectional view of a rotation transmission device according to a first embodiment of the present invention.

FIG. 1 illustrates a rotation transmission device 1 according to the first embodiment of the present invention. This rotation transmission device 1 includes a tubular case 2 having openings at both ends thereof; an input shaft 3 to which rotation is inputted from outside; an output shaft 4 from which the rotation transmitted from the input shaft 3 is outputted to outside; an inner ring 5 disposed on the portion of the input shaft 3 received in the case 2 so as to rotate in unison with the input shaft 3; an outer ring 6 connected to the portion of the output shaft 4 received in the case 2 so as to rotate in unison with the output shaft 4; a plurality of rollers 7a and 7b disposed between the inner periphery of the outer ring 6 and the outer periphery of the inner ring 5; and a roller cage 8 retaining these rollers 7a and 7b.

The case 2 is constituted by a cylindrical large-diameter tubular portion 2a; a cylindrical small-diameter tubular portion 2b having an inner diameter smaller than the inner dimeter of the large-diameter tubular portion 2a; and a coupling portion 2c coupling the large-dimeter tubular portion 2a and the small-diameter tubular portion 2b to each other. One of the opposite ends of the large-diameter tubular portion 2a that is remote from the small-diameter tubular portion 2b is an open end, and one of the opposite ends of the small-diameter tubular portion 2b that is remote from the large-diameter tubular portion 2a is also an open end. The large-diameter tubular portion 2a, the small-diameter tubular portion 2b, and the coupling portion 2c are formed as a seamless integral member.

The input shaft 3 has one end thereof received in the case 2 and the other end protruding beyond the open end of the large-diameter tubular portion 2a of the case 2. The input shaft 3 and the inner ring 5 are formed as a seamless integral member so as to rotate in unison with each other. However, the input shaft 3 and the inner ring 5 may be formed as separate members connected together, e.g., by serration fitting so as to rotate in unison with each other.

The output shaft 4 is aligned with the input shaft 3 in a straight line. The output shaft 4 has one end thereof received in the case 2, and has the other end thereof protruding beyond the open end of the small-diameter tubular portion 2b of the case 2. The output shaft 4 and the outer ring 6 are formed as a seamless integral member so as to rotate in unison with each other. The outer ring 6 is an annular portion of this integral member that surrounds the inner ring 5. While, in the embodiment, the outer ring 6 and the output shaft 4 are formed as an integral member, the outer ring 6 and the output shaft 4 may be formed as separate members connected together, e.g., by serration fitting so as to rotate in unison with each other. An intermediate bearing 9 is mounted between the inner ring 5 and the outer ring 6 so as to couple the inner and outer rings 5 and 6 together for rotation relative to each other.

Figure 2:
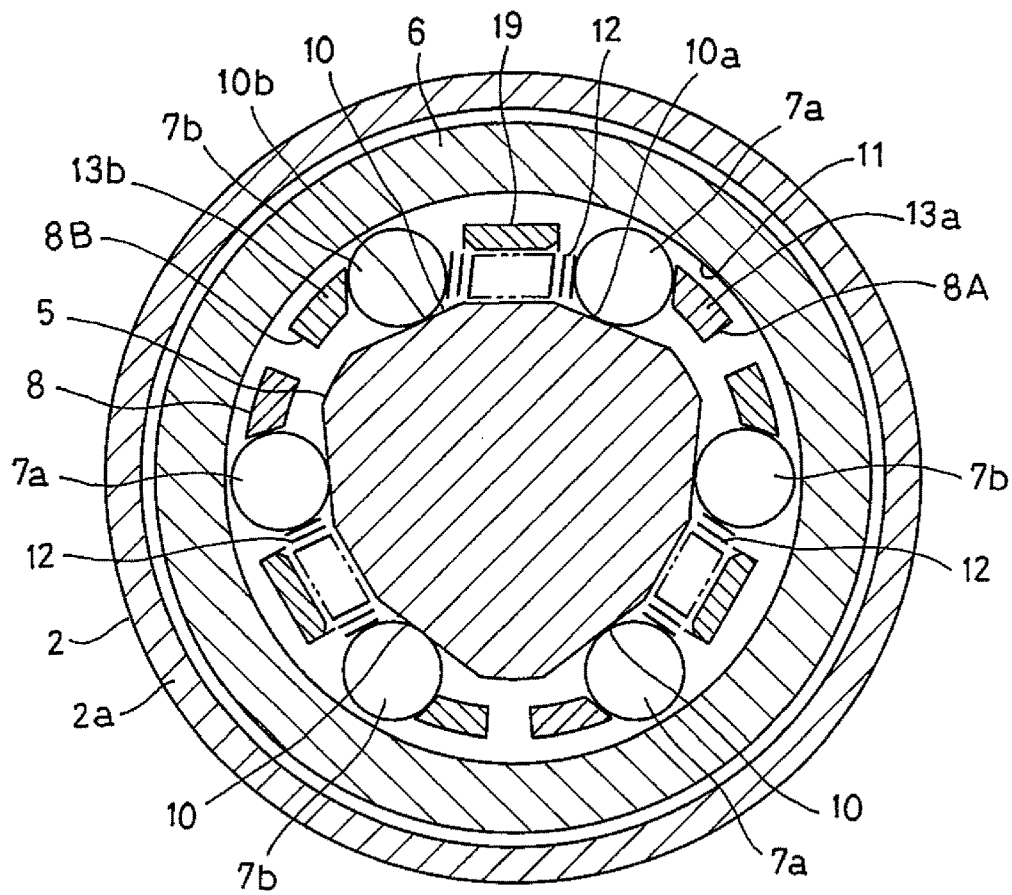
FIG. 2 is a sectional view taken along line II-II of FIG. 1.
Figure 3:
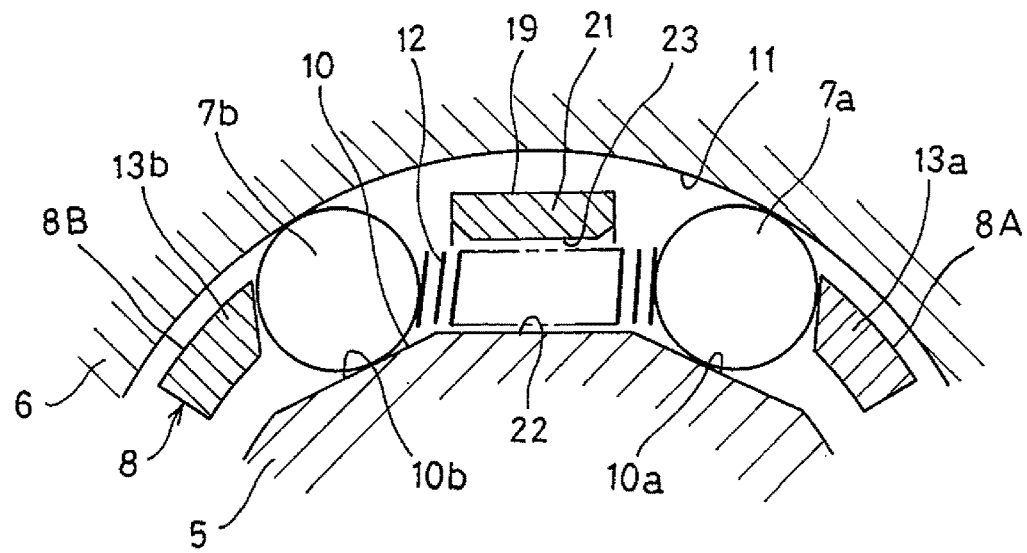
FIG. 3 is an enlarged sectional view illustrating a pair of rollers and their vicinity when the roller cage of FIG. 2 has moved from a disengaged position to an engaged position.

As illustrated in FIGS. 2 and 3, the inner ring 5 has, on its outer periphery, a plurality of cam surfaces 10 circumferentially equidistantly spaced apart from each other. Each cam surface 10 is constituted by a front cam surface portion 10a and a rear cam surface portion 10b disposed rearward of the front cam surface portion 10a in the normal rotation direction of the inner ring 5. The outer ring 6 has, on its inner periphery, a cylindrical surface 11 radially opposed to the cam surfaces 10.

Each pair of rollers 7a and 7b that are circumferentially opposed to each other via a roller separation spring 12 are disposed between the respective cam surface 10 and the cylindrical surface 11. Of the pair of rollers 7a and 7b, the roller 7a, located forward in the normal rotation direction, is disposed between the front cam surface portion 10a and the cylindrical surface 11, and the roller 7b, located rearward in the normal rotation direction, is disposed between the rear cam surface portion 10b and the cylindrical surface 11. The roller separation spring 12 presses the pair of rollers 7a and 7b in the directions in which the distance between the rollers 7a and 7b increases.

The front cam surface portion 10a of each cam surface 10 is formed such that the radial distance between the front cam surface portion 10a and the cylindrical surface 11 gradually decreases from the position of the roller 7a in the normal rotation direction. The rear cam surface portion 10b is formed such that the radial distance between the rear cam surface portion 10b and the cylindrical surface 11 gradually decreases from the position of the roller lain the direction opposite to the normal rotation direction. While, in FIG. 3, the front and rear cam surface portions 10a and 10b are formed as separate flat surfaces inclined in opposite directions to each other, the front and rear cam surface portions 10a and 10b may be, respectively, front and rear portions, with respect to the normal rotation direction, of a single flat surface that lies in a single common plane. Also, while the front and rear cam surface portions 10a and 10b may be curved surfaces, by forming, as illustrated in FIG. 3, the front and rear cam surface portions 10a and 10b as a flat surface or surfaces, it is possible to reduce the manufacturing cost.

As illustrated in FIGS. 1 to 3, the roller cage 8 is constituted by a first split cage portion 8A supporting the roller 7a of each pair of rollers 7a and 7b that are circumferentially opposed to each other via the roller separation spring 12; and a second split cage portion 8B supporting the other roller 7b of each pair. The first split cage portion 8A and the second split cage portion 8B are supported for rotation relative to each other, to support, respectively, the rollers 7a and the rollers 7b such that the distance between a respective pair of the rollers 7a and 7b changes with the relative rotation of the first and second split retainer cage portions 8A and 8B.

The first split cage portion 8A includes a plurality of pillars 13a circumferentially spaced apart from each other; and an annular flange 14a coupling the ends of these pillars 13a together. Similarly, the second split cage portion 8B also includes a plurality of pillars 13b circumferentially spaced apart from each other; and an annular flange 14b coupling the ends of these pillars 13b together.

The pillars 13a of the first split cage portion 8A and the pillars 13b of the second split cage portion 8B are inserted between the inner periphery of the outer ring 6 and the outer periphery of the inner ring 5 such that each pair of rollers 7a and 7b that are circumferentially opposed to each other via the roller separation spring 12 are disposed circumferentially between the corresponding pillars 13a and 13b.

As illustrated in FIG. 1, the flange 14a of the first split cage portion 8A and the flange 14b of the second split cage portion 8B are axially opposed to each other with the flange 14b located axially closer to the inner ring 5 than is the flange 14a. A plurality of circumferentially spaced apart cutouts 15 (see FIG. 6) are formed in the flange 14b of the second split cage portion 8B for the purpose of avoiding interference with the pillars 13a of the first split cage portion 8A.

The inner periphery of the flange 14a of the first split cage portion 8A and the inner periphery of the flange 14b of the second split cage portion 8B are rotatably supported by a cylindrical surface 16 on the outer periphery of the input shaft 3. This enables the first and second split cage portions 8A and 8B to move between (i) an engaged position (see FIG. 3) in which the distance between each pair of the rollers 7a and 7b increases until the pairs of rollers 7a and 7b are engaged with the cylindrical surface 11 and the respective cam surfaces 10, and (ii) a disengaged position (see FIG. 2) in which the distance between each pair of the rollers 7a and 7b decreases until the pairs of rollers 7a and 7b are disengaged from the cylindrical surface 11 and the respective cam surfaces 10. The flange 14a of the first split cage portion 8A is axially supported via a thrust bearing 17 by an annular protrusion 18 on the outer periphery of the input shaft 3, and thus its axial movement is restricted.

Figure 4:
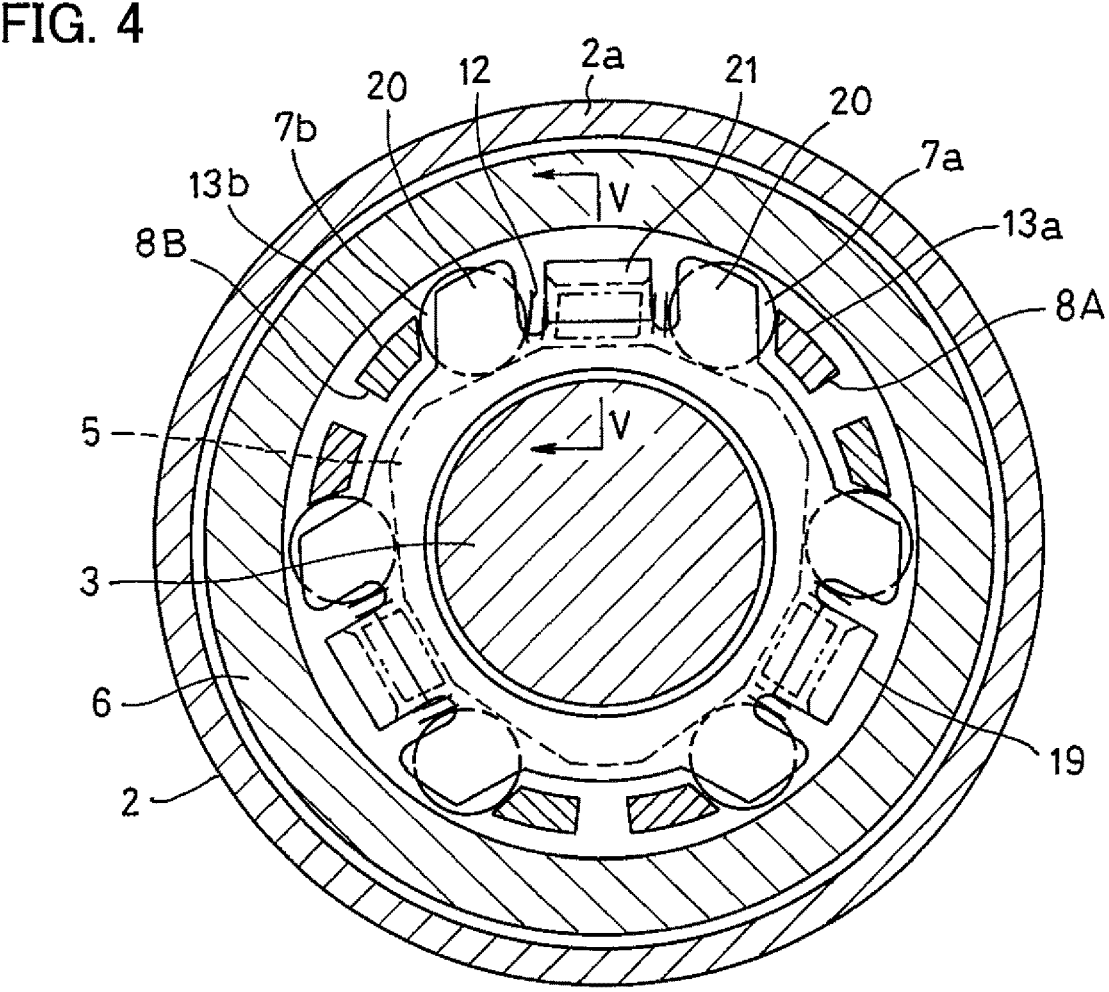
FIG. 4 is a sectional view taken along line IV-IV of FIG. 1.

As illustrated in FIG. 4, a spring holder 19 is fixed to a side surface of the inner ring 5. The spring holder 19 includes stopper pieces 20 each located between the corresponding pillars 13a and 13b that are circumferentially opposed to each other with a pair of rollers 7a and 7b disposed therebetween. When each pair of pillars 13a and 13b move in the directions in which the distance between the pair of rollers 7a and 7b decreases, the corresponding stopper piece 22 receives, on both side edges thereof, the respective pillars 13a and 13b. This prevents the roller separation springs 12, which are each located between a respective pair of the rollers 7a and 7b, from being excessively compressed and broken, and also stabilizes the positions of the rollers 7a and 7b relative to the inner ring 5 when the distance between each pair of the rollers 7a and 7b decreases.

Figure 5:
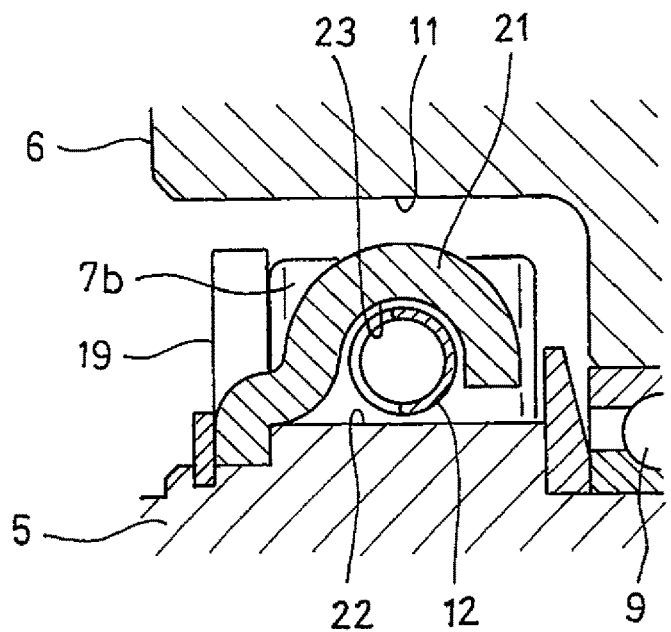
FIG. 5 is a sectional view taken along line V-V of FIG. 4.

As illustrated in FIG. 5, the spring holder 19 includes spring holding pieces 21 holding the respective roller separation springs 12. The spring holding pieces 21 are integral with the respective stopper pieces 20 and axially extends between the inner periphery of the outer ring 6 and the outer periphery of the inner ring 5. The spring holding pieces 21 are radially opposed to spring supporting surfaces 22 (see FIG. 3) formed between the front cam surface portions 10a and the rear cam surface portions 10b of the respective cam surfaces 10 on the outer periphery of the inner ring 5. Recesses 23 are formed in the surfaces of the spring holding pieces 21 opposed to the respective spring supporting surfaces 22 such that the roller separation springs 12 are received in the respective recesses 23. The roller separation springs 12 are compression coil springs. The recesses 23 of the respective spring holding pieces 21 prevent the roller separation springs 12 from axially falling off from between the inner periphery of the outer ring 6 and the outer periphery of the inner ring 5, by restricting movement of the roller separation springs 12.

As illustrated in FIG. 1, the rotation transmission device includes, between the inner periphery of the large-diameter tubular portion 2a of the case 2 and the outer periphery of the input shaft 3, an annular electromagnet 30; an armature 31 supported for axial movement when the electromagnet 30 is energized; a rotor 32 disposed between the electromagnet 30 and the armature 31; and a ball ramp mechanism 33 configured to convert the axial movement of the armature 31 into motion of the roller cage 8 (i.e., motions of the first and second split cage portions 8A and 8B) from the engaged position (see FIG. 3) to the disengaged position (see FIG. 2).

The armature 31 includes an annular disk portion 34, and a cylindrical portion 35 integral with the disk portion 34 and axially extending from the outer periphery of the disk portion 34. The second split cage portion 8B includes a cylindrical portion 36 integral with the flange 14b and axially extending from the outer periphery of the flange 14b. The cylindrical portion 36 is press-fitted to the cylindrical portion 35 of the armature 31 such that the armature 31 is coupled to the second split cage portion 8B so as to axially move in unison with the second split cage portion 8B. Also, the armature 31 is rotatably and axially movably supported by a cylindrical surface 37 of the annular protrusion 18 on the outer periphery of the input shaft 3. The armature 31 is axially movably supported at two locations axially spaced apart from each other (specifically, at the inner periphery of the armature 31 and the inner periphery of the second split cage portion 8B). This prevents the armature 31 from tilting relative to the direction orthogonal to the axial direction.

The rotor 32 is fitted, with interference, to the outer periphery of the input shaft 3, and thus supported on the outer periphery of the input shaft 3 so as to be movable in neither of the axial and circumferential directions. The rotor 32 and the armature 31 are formed of a magnetic material (iron, silicon steel, etc.). The rotor 32 has, in its surface opposed to the armature 31, a plurality of circumferentially elongated holes 38 axially extending through the rotor 32 and circumferentially spaced apart from each other.

The electromagnet 30 includes an annular field core 40 formed of a magnetic material; and a solenoid coil 41 wound around the field core 40. The field core 40 is fitted to the inner periphery of the large-diameter tubular portion 2a of the case 2. When the solenoid coil 41 is energized, the electromagnet 30 forms a magnetic path passing through the field core 40, the rotor 32 and the armature 31, thereby attracting the armature 31 to the rotor 32.

A cover member 42 comprising an annular plate is fitted to the inner periphery of the open end of the large-diameter tubular portion 2a so as to be axially opposed to the electromagnet 30. The cover member 42 is fitted to axially abut against the field core 40. The cover member 42 is prevented from moving out of the case 2 by a snap ring 43 fitted to the inner periphery of the open end of the large-diameter tubular portion 2a.

Figure 6:
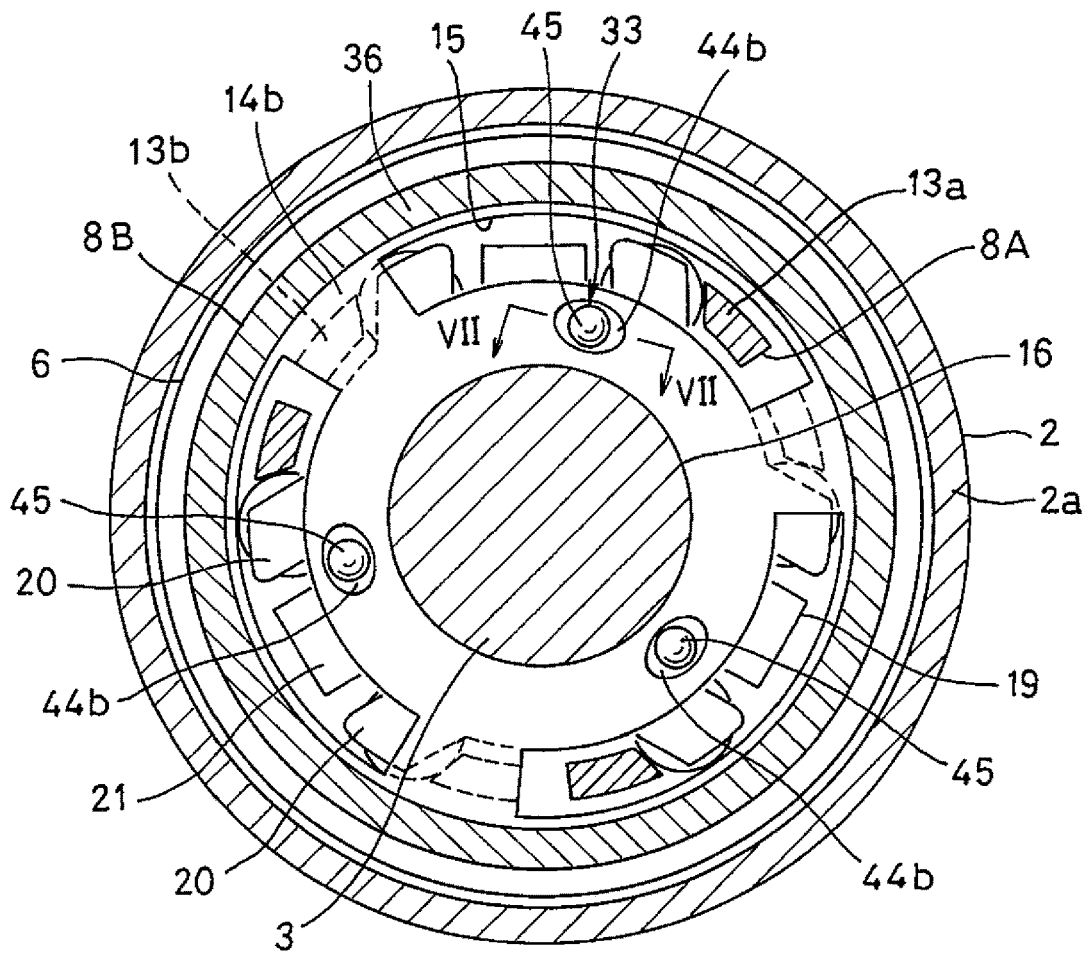
FIG. 6 is a sectional view taken along line VI-VI of FIG. 1.
Figure 7A:
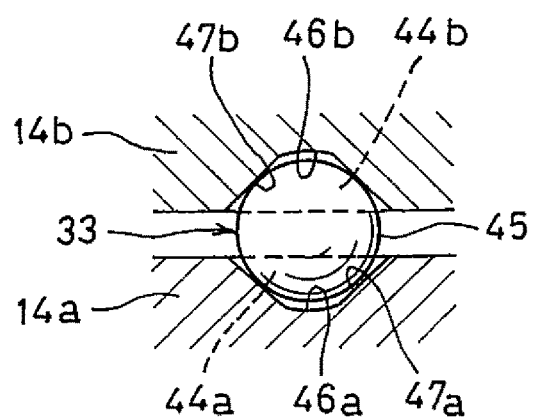
FIG. 7A is a sectional view taken along line VII-VII of FIG. 6.
Figure 7B:
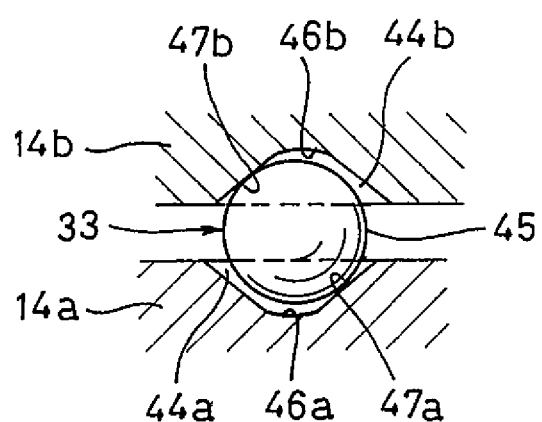
FIG. 7B is a sectional view illustrating the state in which, due to relative rotation of the first and second split cage portions of FIG. 7A, a ball has rolled in the circumferential direction away from the deepest portions of each pair of inclined grooves, and thus the axial distance between the first and second split cage portions has increased.

As illustrated in FIGS. 6, 7A and 7B, the ball ramp mechanism 33 is constituted by inclined grooves 44a in the surface of the flange 14a of the first split cage portion 8A opposed to the flange 14b of the second split cage portion 8B; inclined grooves 44b in the surface of the flange 14b opposed to the flange 14a; and balls 45 each received between a respective opposed pair of the inclined grooves 44a and 44b. The inclined grooves 44a and 44b extend in the circumferential direction. The inclined grooves 44a each includes a groove bottom 47a inclined to gradually become shallow from the axially deepest portion 46a of the groove 44a in one of the opposite circumferential directions. The inclined grooves 44b each includes a groove bottom 47b inclined to gradually become shallow from the axially deepest portion 46b of the groove 44b in the other of the opposite circumferential directions. The balls 45 are each sandwiched between the groove bottom 47a and the groove bottom 47b of a respective opposed pair of the inclined grooves.

The ball ramp mechanism 33 is configured such that, when the flange 14b of the second split cage portion 8B axially moves toward the flange 14a of the first split cage portion 8A, each ball 45 rolls toward the deepest portions 46a and 46b of the inclined grooves 44a and 44b, thereby rotating the first and second split cage portions 8A and 8B relative to each other such that the pillars 13a of the first split cage portion 8A and the pillars 13b of the second split cage portion 8B move in the directions in which the distance between each pair of the rollers 7a and 7b decreases.

The armature 31 is biased in the direction away from the rotor 32 by the force of the roller separation springs 12. In particular, the force with which the roller separation springs 12 illustrated in FIG. 2 presses the rollers 7a and 7b in the directions in which the distance between each pair of rollers 7a and 7b increases is transmitted to the first split cage portion 8A and the second split cage portion 8B as a circumferential force. Then, this circumferential force, which the first and second split cage portions 8A and 8 receive, is converted, by the ball ramp mechanism 33 illustrated in FIGS. 6, 7A and 7B, into a force in the axial direction away from the rotor 32, and is transmitted to the second split cage portion 8B. Since, as illustrated in FIG. 1, the armature 31 is fixed to the second split cage portion 81S, the armature 31 is biased in the direction away from the rotor 31 by the force transmitted from the roller separation springs 12 via the ball ram mechanism 33.

As illustrated in FIG. 1, the large-diameter tubular portion 2a includes flanges 48 for fixing which protrude radially outwardly from the outer periphery of the large-diameter tubular portion 2a. Axial through holes 49 are formed in the respective flanges 48. By inserting bolts (not shown) into the respective through holes 49, and tightening the bolts, it is possible to fix the flanges 48 to a support member (e.g., a rack housing 75 shown in FIG. 15).

Figure 8:
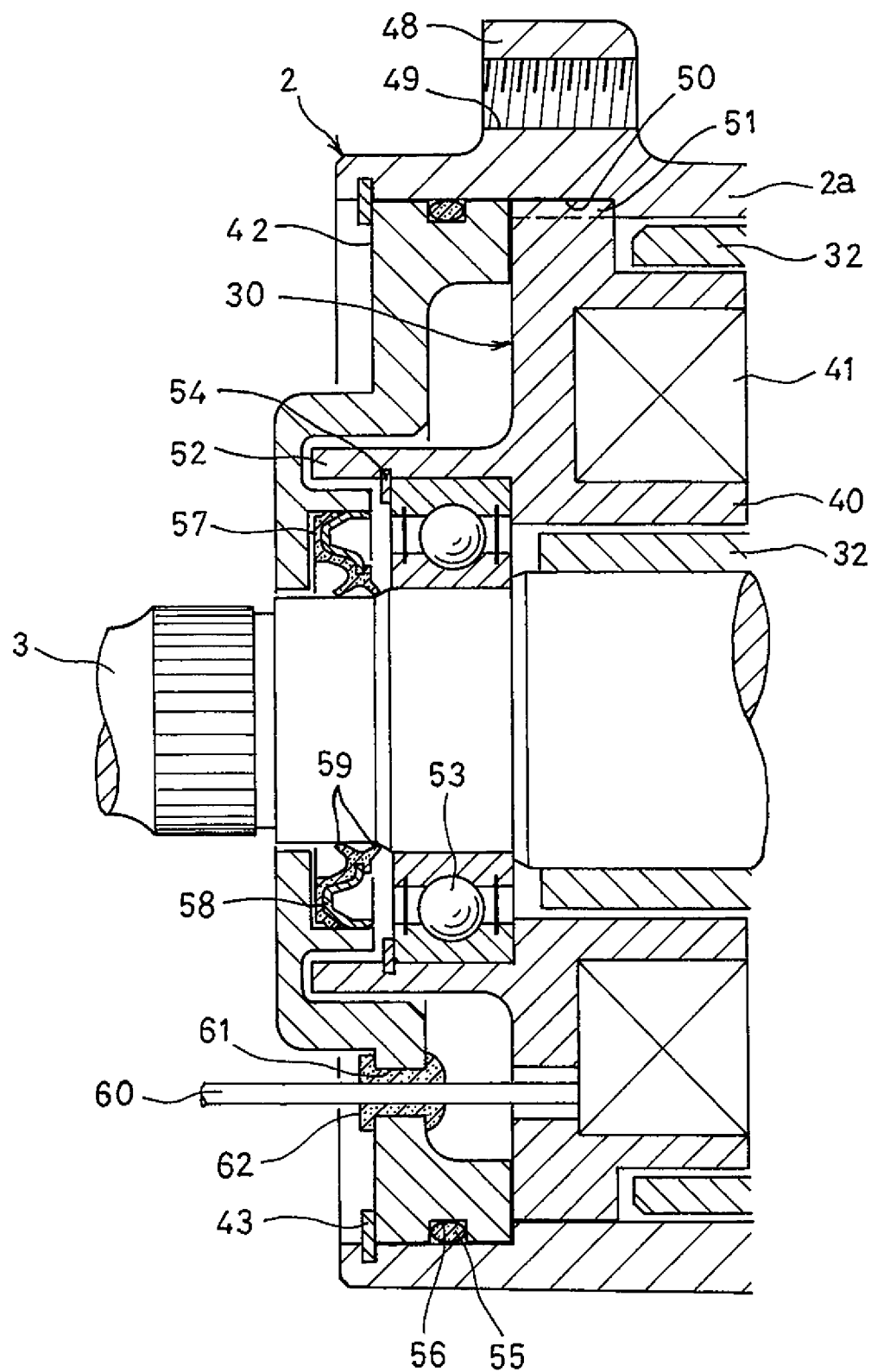
FIG. 8 is an enlarged sectional view illustrating the open end of a large-diameter tubular portion of the case illustrated in FIG. 1, and the vicinity of this open end.

As illustrated in FIG. 8, the field core 40 includes, on its outer periphery, a protrusion 51 which engages an axial groove 50 formed in the inner periphery of the large-diameter tubular portion 2a, and, by the engagement between the protrusion 51 and the axial grove 50, the field core 40 is rotationally fixed relative to the case 2.

A bearing fitting tube 52 is fixedly disposed on a surface of the field core 40 on its side opposite from its side to which the armature 31 (see FIG. 1) is attracted. The bearing fitting tube 52 may be provided separately from the field core 40, and fixed to the field core 40, e.g., by welding, or may be seamlessly and integrally connected to the fields core 40. An input shaft bearing 53 is mounted between the inner periphery of the bearing fitting tube 52 and the outer periphery of the input shaft 3 to rotatably support the input shaft 3. The input shaft bearing 53 may be a sealed bearing (sealed deep groove ball bearing in the shown example) in which grease is sealed in the annular bearing space between the inner ring and the outer ring, by bearing seals on both axial sides of the rolling elements, which roll between the inner ring and the outer ring. A snap ring 54 is mounted to the inner periphery of the bearing fitting tube 52 to prevent separation of the input shaft bearing 53.

Figure 10:
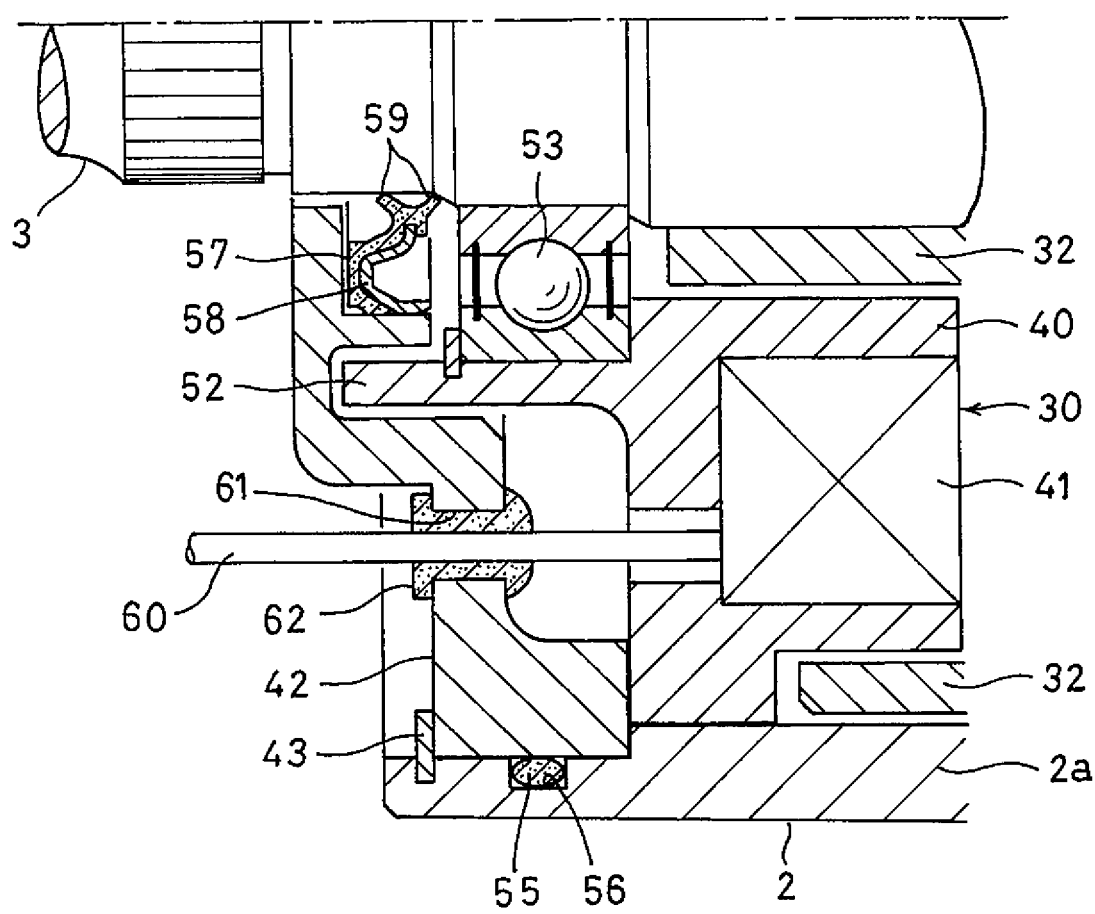
FIG. 10 illustrates a modification in which a ring groove for receiving the O-ring of FIG. 8 is formed, instead of in the outer peripheral surface of a cover member, in the inner peripheral surface of the large-diameter tubular portion of the case.

The cover member 42 is a circular annular plate-shaped member fitted to the inner periphery of the large-diameter tubular portion 2a of the case 2, and is formed of aluminum. An O-ring 55 made of rubber provides a seal between the outer periphery of the cover member 42 and the inner periphery of the large-diameter tubular portion 2a. The O-ring 55 is fitted in a ring groove 56 formed in the outer periphery of the cover member 42, while being compressed between the inner surface of the ring groove 56 and the cylindrical inner peripheral surface of the large-diameter tubular portion 2a. As illustrated in FIG. 10, the O-ring 55 may be instead fitted in a ring groove 56 formed in the inner periphery of the large diameter tubular portion 2a, while being compressed between the inner surface of the ring groove 56 and the cylindrical outer peripheral surface of the cover member 42.

As illustrated in FIG. 8, an oil seal 57 provides a seal between the inner periphery of the cover member 42 and the outer periphery of the input shaft 3. The oil seal 57 includes an annular metal core 58 comprising a metal plate; and seal lips 59 made of rubber and bonded to the metal core 58. The seal lips 59 are in contact with the outer periphery of the input shaft 3 so as to be slidable in the circumferential direction.

The cover member 42 is formed with a through hole 61 through which a lead wire 60 that supplies electric power to the electromagnet 30 is inserted. A grommet 62 made of rubber is fitted in the through hole 61 so as to provide a seal between the inner periphery of the through hole 61 and the outer periphery of the lead wire 60. The grommet 62 includes a tubular portion filling the annular space between the inner periphery of the through hole 61 and the outer periphery of the lead wire 60; and large-outer-diameter portions formed at both ends of the tubular portion, and engaged with the edges of the respective openings of the through hole 61.

Figure 9:
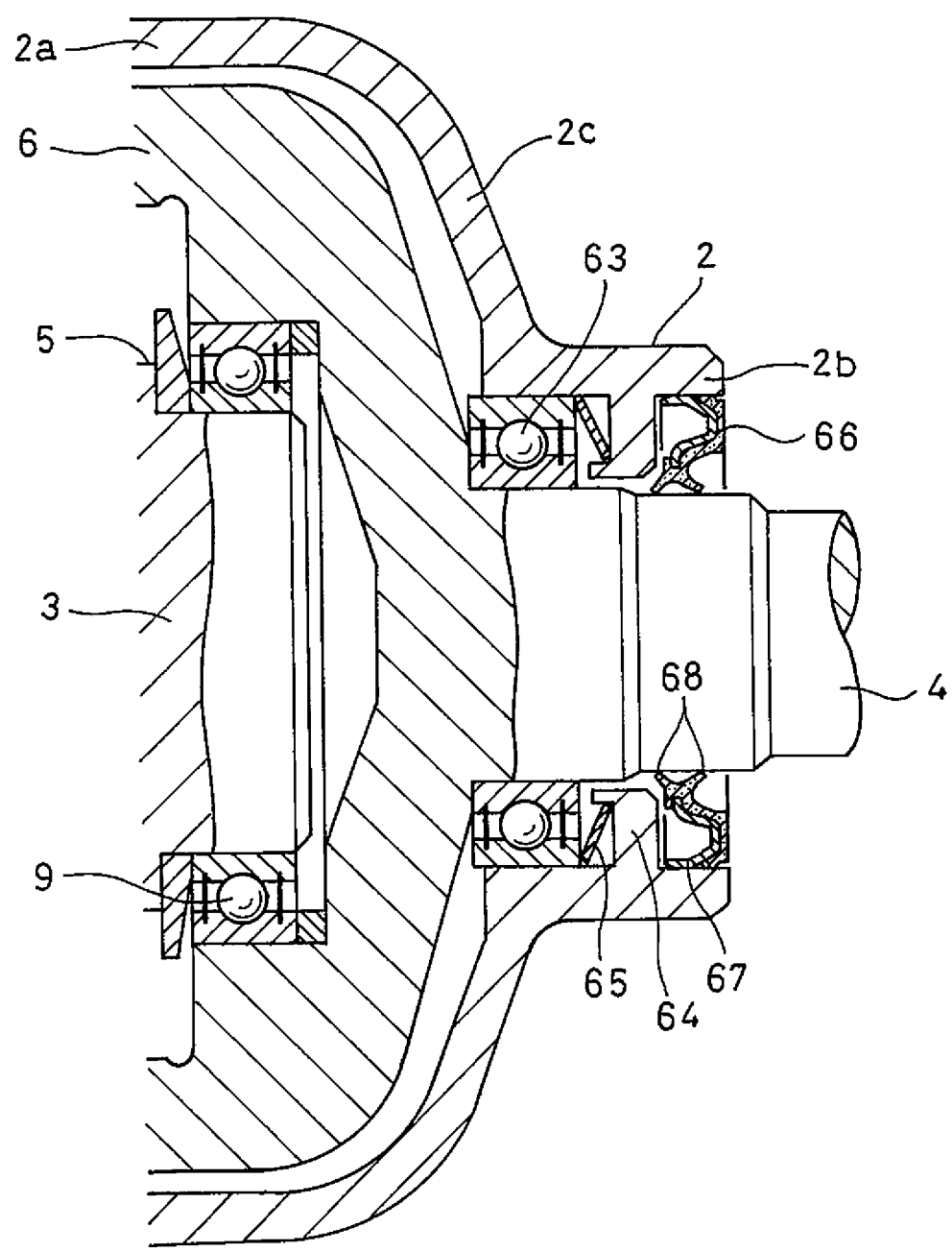
FIG. 9 is an enlarged sectional view illustrating a small-diameter tubular portion of the case illustrated in FIG. 1, and the vicinity of this tubular portion.

As illustrated in FIG. 9, an output shaft bearing 63 is mounted on the inner periphery of the small-diameter tubular portion 2b of the case 2, and rotatably supports the input shaft 4. As with the input shaft bearing 53, the output shaft bearing 63 may be a sealed bearing (sealed deep groove ball bearing in the shown example) in which grease is sealed in the annular bearing space between the inner ring and the outer ring, by bearing seals on both axial sides of the rolling elements, which roll between the inner ring and the outer ring. The small-diameter tubular portion 2b includes, on its inner periphery, an inwardly extending annular protrusion 64 located on one side of the fitted position of the output shaft bearing 63 that is remote from the large-diameter tubular portion 2a (see FIG. 1). An elastic member 65 is mounted, while being axially compressed, between the annular protrusion 64 and the output shaft bearing 63.

An output shaft seal member 66 provides a seal between the outer periphery of the output shaft 4 and the inner periphery of the open end of the small-diameter tubular portion 2b. The output shaft seal member 66 is an oil seal including an annular metal core 67 comprising a metal plate; and seal lips 68 made of rubber and bonded to the metal core 67. The seal lips 68 are in contact with the outer periphery of the output shaft 4 so as to be slidable in the circumferential direction.

It is now described how this rotation transmission device 1 operates.

As illustrated in FIG. 1, while the electromagnet 30 is energized, this rotation transmission device 1 is in the disengaged state (idling state) in which rotation is not transmitted between the input shaft 3 and the output shaft 4. In particular, when the electromagnet 30 is energized, the armature 31 is attracted to the rotor 32, and, due to this motion of the armature 31, the flange 14b of the second split cage portion 8B axially moves toward the flange 14a of the first split cage portion 8A. This causes each ball 44 of the ball ramp mechanism 33 to roll toward the deepest portions 46a and 46b of the respective inclined grooves 44a and 44b, so that the first and second split cage portions 8A and 8B rotate relative to each other. Due to this relative rotation of the first and second split cage portions 8A and 8B, the pillars 13a of the first split cage portion 8A and the pillars 13b of the second split cage portion 8B press, respectively, the rollers 7a and the rollers 7b in the directions in which the distance between each pair of the rollers 7a and 7b decreases. This (i) releases an engagement standby state of the rollers 7a, which are located forward in the normal rotation direction, (state in which, though minute gaps are present between the cylindrical surface 11 and the respective rollers 7a, as soon as the input shaft 3 rotates in the reverse rotation direction, the rollers 7a engage with the cylindrical surface 11 and the respective front cam surface portions 10a), and also (ii) releases an engagement standby state of the rollers 7b, which are located rearward in the normal rotation direction, (state in which, though minute gaps are present between the cylindrical surface 11 and the respective rollers 7b, as soon as the input shaft 3 rotates in the normal rotation direction, the rollers 7b engage with the cylindrical surface 11 and the respective rear cam surface portions 10b). When, in this state, rotation is inputted to the input shaft 3, the rotation is not transmitted to the outer ring 6 from the input shaft 3, and the inner member 2 idles.

On the other hand, while the electromagnet 30 is de-energized, this rotation transmission device 1 is in the engaged state in which rotation is transmitted between the input shaft 3 and the output shaft 4. In particular, when the electromagnet 30 is de-energized, the armature 31 is axially moved away from the rotor 32 by the force of the roller separation springs 12. At this time, by the force of the roller separation springs 12, which press the respective pairs of rollers 7a and 7b in the directions in which the distance between each pair of the rollers 7a and 7b increases, the rollers 7a, which are located forward in the normal rotation direction, are engaged with the cylindrical surface 11 on the inner periphery of the outer ring 6 and the respective front cam surface portions 10a on the outer periphery of the input shaft 3, and the rollers 7b, which are located rearward in the normal rotation direction, are engaged with the cylindrical surface 11 on the inner periphery of the outer ring 6 and the respective rear cam surface portions 10b on the outer periphery of the input shaft 3. In this state, when the input shaft 3 rotates in the normal rotation direction, this rotation is transmitted to the outer ring 6 from the input shaft 3 via the rollers 7b, which are located rearward in the normal rotation direction. Also, when the input shaft 3 rotates in the reverse rotation direction, this rotation is transmitted to the outer ring 6 from the input shaft 3 via the rollers 7a, which are located forward in the normal rotation direction.

Since, in this rotation transmission device 1, the output shaft seal member 66 provides a seal between the outer periphery of the output shaft 4 and the inner periphery of the open end of the small-diameter tubular portion 2b of the case 2, and the cover member 42, the O-ring 55 and the oil seal 57 provides a seal between the outer periphery of the input shaft 3 and the inner periphery of the open end of the large-diameter tubular portion 2a of the case 2, even if the rotation transmission device 1 is used in an environment where foreign matter such as muddy water could adhere to the device, it is possible to prevent such foreign matter from entering the device.

However, in the arrangement where the open end of the large-diameter tubular portion 2 of the case 2 is completely closed to prevent foreign matter such as muddy water from entering the rotation transmission device 1, the motion of the rotation transmission device 1 may become unstable. That is, in the arrangement where the large-diameter tubular portion 2 of the case 2 of the rotation transmission device 1 has its open end completely closed, heat tends to get trapped within the case 2, and the temperature of the electromagnet 30, which is disposed within the case 2, tends to rise. If the temperature of the electromagnet 30 rises too high, the electrical resistance of the solenoid coil 41 increases, and thus, the force attracting the armature 31 when the electromagnet 30 is energized decreases. This could result in the roller cage 8 not moving when the electromagnet 30 is energized, from the engaged position to the disengaged position, thus destabilizing the motion of the rotation transmission device 1.

This problem is overcome by the rotation transmission device 1 of the above embodiment as follows. That is, since the cover member 42 is disposed axially opposed to the electromagnet 30, and is also formed of aluminum, which has excellent thermal conductivity, it is possible, due to heat dissipation through the cover member 42, to effectively prevent a rise in the temperature of the electromagnet 30, which is disposed within the case 2, and thus to prevent a reduction in the force of the electromagnet 30 attracting the armature 31 due to a rise in the temperature of the electromagnet 30. In addition, since aluminum is a non-magnetic material, it is possible to prevent the magnetic flux generated from the electromagnet 30 from being absorbed by the cover member 42, and thus to prevent a reduction in the attracting force of the electromagnet 30 due to magnetic flux leakage.

Also, since, in this rotation transmission device 1, an oil seal 57 including a metal core 58 and seal lips 59 made of rubber is used as an inner seal member for sealing between the inner periphery of the cover member 42 and the outer periphery of the input shaft 3, compared to using, e.g., an O-ring as the inner seal member, it is possible to reliably prevent foreign matter such as muddy water from entering the rotation transmission device 1 through a space between the input shaft 3 and the cover member 42, which rotate relative to each other.

Also, since, in this rotation transmission device 1, an O-ring 55 is used as an outer seal member for sealing between the outer periphery of the cover member 42 and the inner periphery of the large-diameter tubular portion 2a, it is possible to provide, at a low cost, a seal between the open end of the case 2 and the cover member 42, which do not rotate relative to each other.

Figure 11:
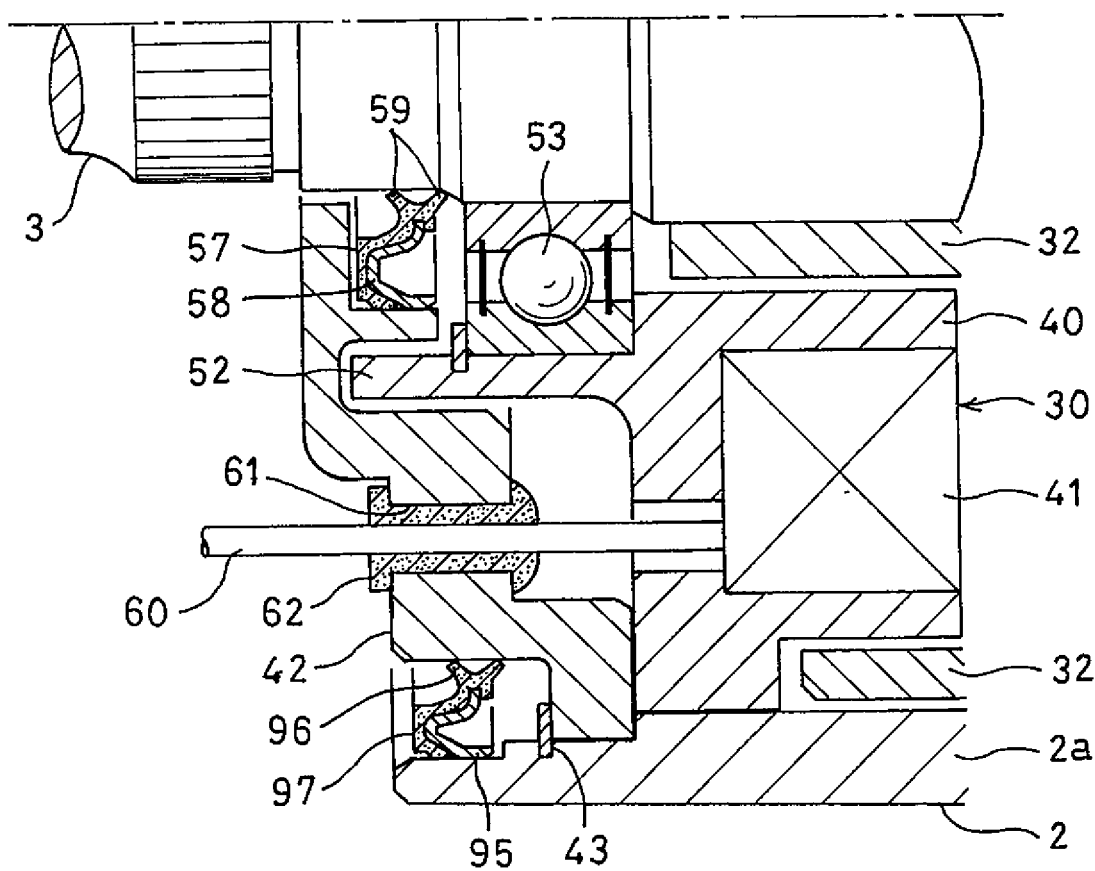
FIG. 11 illustrates a modification in which an oil seal is used instead of the O-ring of FIG. 8.

As illustrated in FIG. 11, as the outer seal member for sealing between the outer periphery of the cover member 42 and the inner periphery of the large-diameter tubular portion 2a, an oil seal 97 may be used which includes an annular metal core 95 comprising a metal plate; and seal lips 96 made of rubber and bonded to the metal core 95. Such an oil seal provides a more reliable seal. The metal core 95 is press-fitted to the inner periphery of the large-diameter tubular portion 2a, and the seal lips 96 are in contact with outer periphery of the cover member 42 with interference.

Also, since, in the above rotation transmission device 1, the grommet 62 provides a seal between the inner periphery of the through hole 61 and the outer periphery of the lead wire 60, it is possible to reliably prevent foreign matter such as muddy water from entering the rotation transmission device 1 through the through hole 61, through which the lead wire 60 is inserted.

Figure 12A:
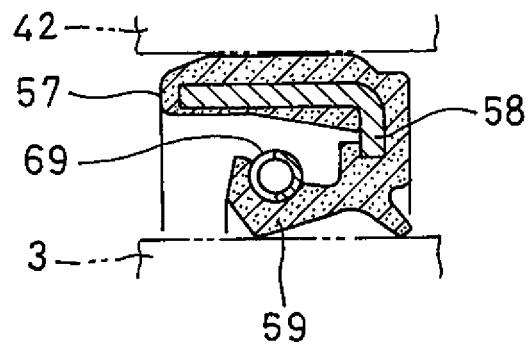
FIG. 12A is a sectional view of an oil seal used as an inner seal member, and including a garter spring for tightening a seal lip from the radially outer side.
Figure 12B:
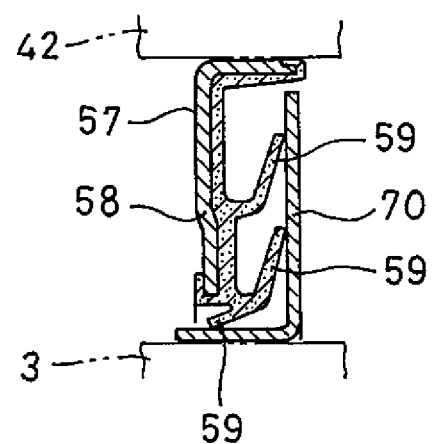
FIG. 12B is a sectional view of an oil seal used as an inner seal member, and including a slinger which has an L-shaped cross section and with which seal lips are in sliding contact

The oil seal 57 for sealing between the inner periphery of the cover member 42 and the outer periphery of the input shaft 3 may include, as illustrated in FIG. 12A, a garter spring 69 that tightens one of the seal lips 59 from radially outward, or may include, as illustrated in FIG. 12B, a stainless steel slinger 70 with which the seal lips 59 are in sliding contact. In FIG. 12B, the slinger 70 is a member having an L-shaped cross section, and fitted, with interference, to the outer periphery of the input shaft 3.

Figure 13:
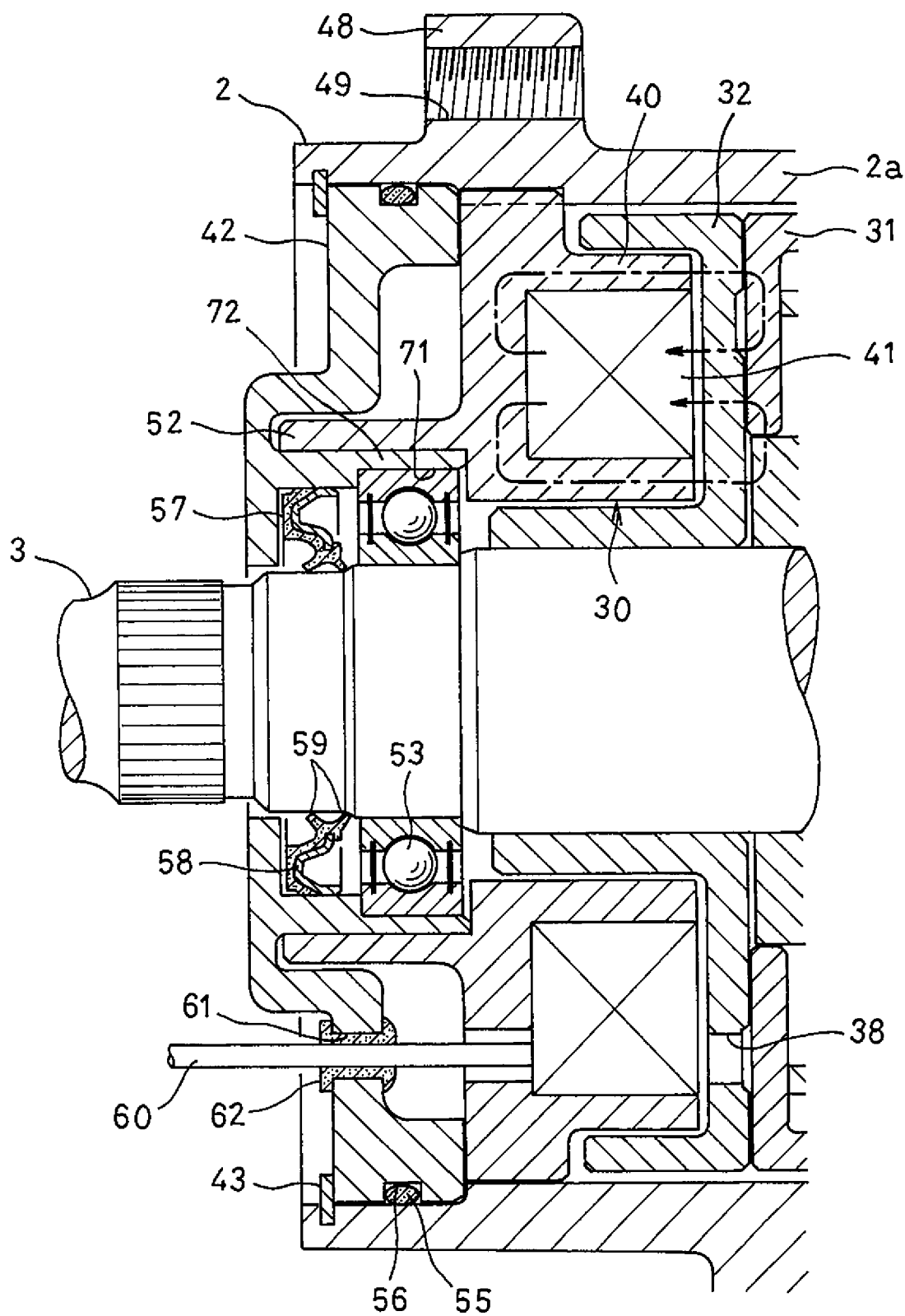
FIG. 13 is a sectional view of a rotation transmission device according to a second embodiment of the present invention.

FIG. 13 illustrates a rotation transmission device 1 according to the second embodiment of the present invention. The elements of the second embodiment corresponding to those of the first embodiment are denoted by the same reference numerals, and their description is omitted.

The cover member 42, which is made of aluminum, has, on its inner periphery, a cylindrical, bearing fitting surface 71 to which the input shaft bearing 53 is fitted. The bearing fitting surface 71 has an axial length larger than the axial width of the input shaft bearing 53. Therefore, an axial gap is defined between the input shaft bearing 53 and the field core 40, that is, the input shaft bearing 53 is kept out of contact with the field core 40.

The bearing fitting surface 71 is disposed on the inner periphery of a cylindrical portion 72 formed on the cover member 42. The cylindrical surface 72 is inserted in the bearing fitting tube 52, which axially extends from the field core 40, and is fitted, with interference, to the inner periphery of the bearing fitting tube 52. Thus, it is possible to avoid the contact of the input shaft bearing 53 with the field core 40, while supporting the input shaft bearing 53 with high rigidity. The axial end surface of the cylindrical portion 72 is in abutment with the field core 40.

In the rotation transmission device 1 of the second embodiment, since the input shaft bearing 53 is disposed on the inner periphery of the cover member 42, which is made of aluminum, i.e., a non-magnetic material, so as to be kept out of contact with the field core 40 of the electromagnet 30, it is possible to prevent the magnetic flux generated from the electromagnet 30 from leaking to the input shaft 3 via the input shaft bearing 53, and thus to improve the force of the electromagnet 30 attracting the armature 31.

Also, in this rotation transmission device 1, since the bearing fitting surface 71 has an axial length larger than the axial width of the input shaft bearing 53, it is possible to reliably prevent the input shaft bearing 53 from coming into contact with the field core 40.

Figure 14:
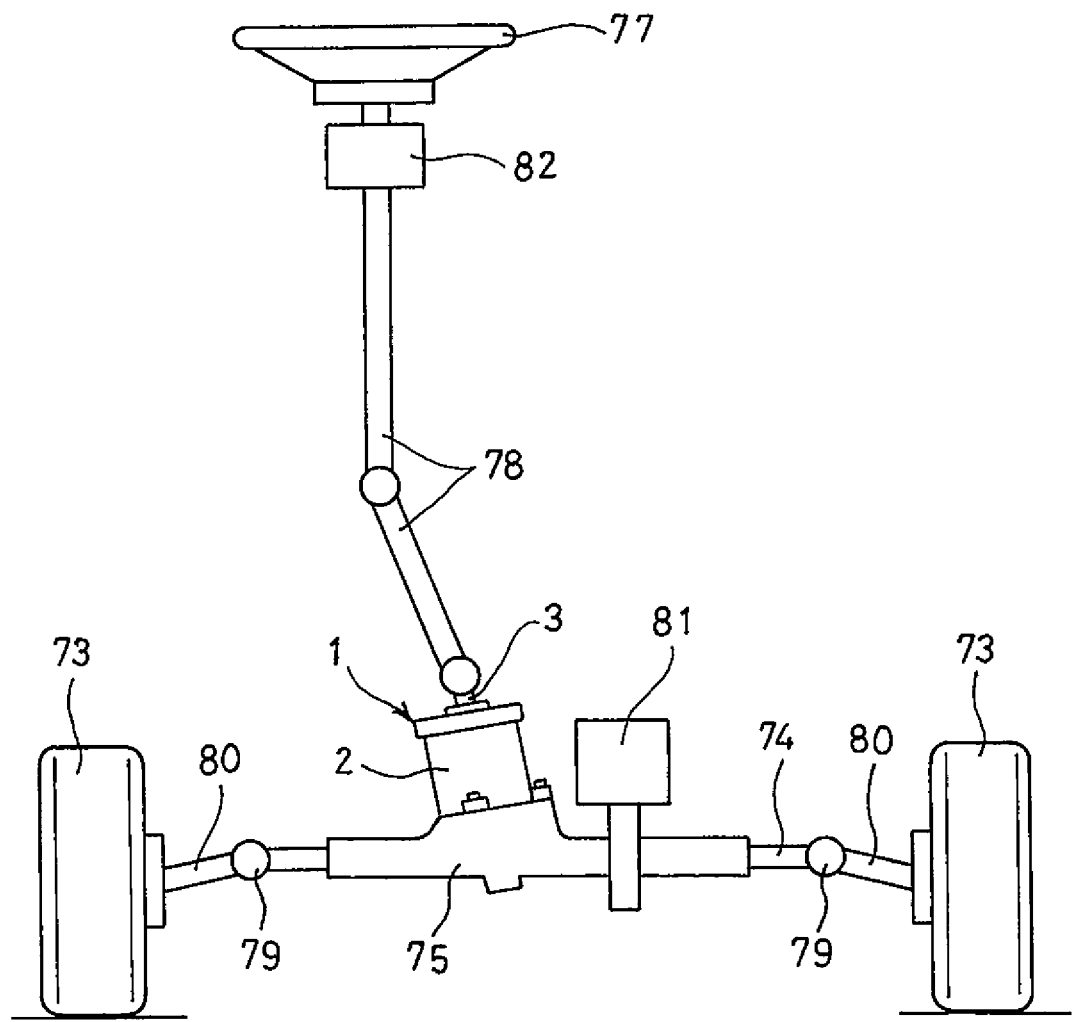
FIG. 14 shows a steering device for a vehicle in which the rotation transmission device embodying the present invention is used.

FIGS. 14 to 17 illustrate a steering device for a vehicle in which the rotation transmission device 1 embodying the present invention is used. The elements corresponding to those of the above embodiments are denoted by the same reference numerals, and their description is omitted As illustrated in FIG. 14, this steering device for a vehicle includes a rack 74 connected to a pair of left and right steered wheels 73; a rack housing 75 in which the rack 74 is received for movement in the left and right directions; a pinion 76 (see FIG. 15) meshing with the rack 74; a rotation transmission device 1 detachably fixed to the rack housing 75; a steering wheel 77 configured to be steered by a driver; and a steering shaft 78 configured to transmit the rotation of the steering wheel 77 to the rotation transmission device 1.

Both ends of the rack 74 are connected, respectively, to knuckle arms 80 of the left and right steered wheels 73 via ball joints 79 such that, when the rack 74 moves to the left or right, the knuckle arms 80 pivot according to this movement, thereby changing the directions of the steered wheels 73. A steering motor 81 configured to drive the rack 74 to the left and right is mounted to the rack housing 75. The mounting position of the steering motor 81 on the rack housing 75, and the mounting position of the rotation transmission device 1 on the rack housing 75 are spaced apart from each other.

A reaction force motor 82 configured to apply a steering reaction force to the steering wheel 77 is mounted to one of the opposite ends of the steering shaft 78 that is close to the steering wheel 77. A steering angle sensor configured to detect the steering angle of the steering wheel 77 is mounted in the reaction force motor 82.

Figure 15:
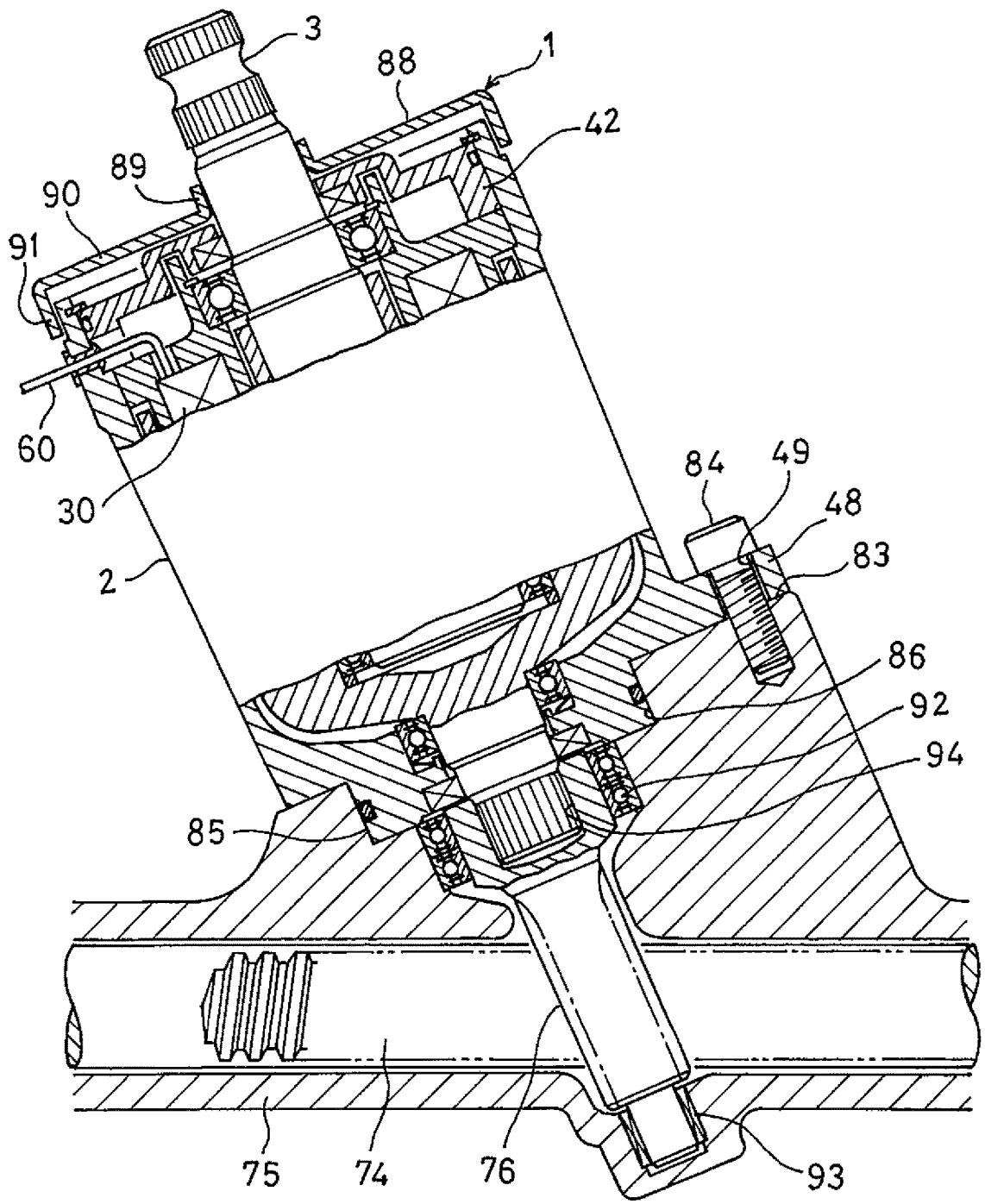
FIG. 15 is an enlarged sectional view illustrating the rotation transmission device of FIG. 14 and the vicinity thereof.

As illustrated in FIG. 15, the case 2 of the rotation transmission device 1 is detachably fixed to the rack housing 75 by superposing flanges 48 for fixing onto a seat surface 83 formed on the rack housing 75; inserting bolts 84 into the through holes 49 of the respective flanges 48; and tightening the bolts 84. The rack housing 75 has a cylindrical positioning fitting surface 86 to which a cylindrical surface 85 formed on the outer periphery of the small-diameter tubular portion 2b of the case 2 is fitted. An O-ring 87 provides a seal between the cylindrical surface 85 and the positioning fitting surface 86.

Figure 16:
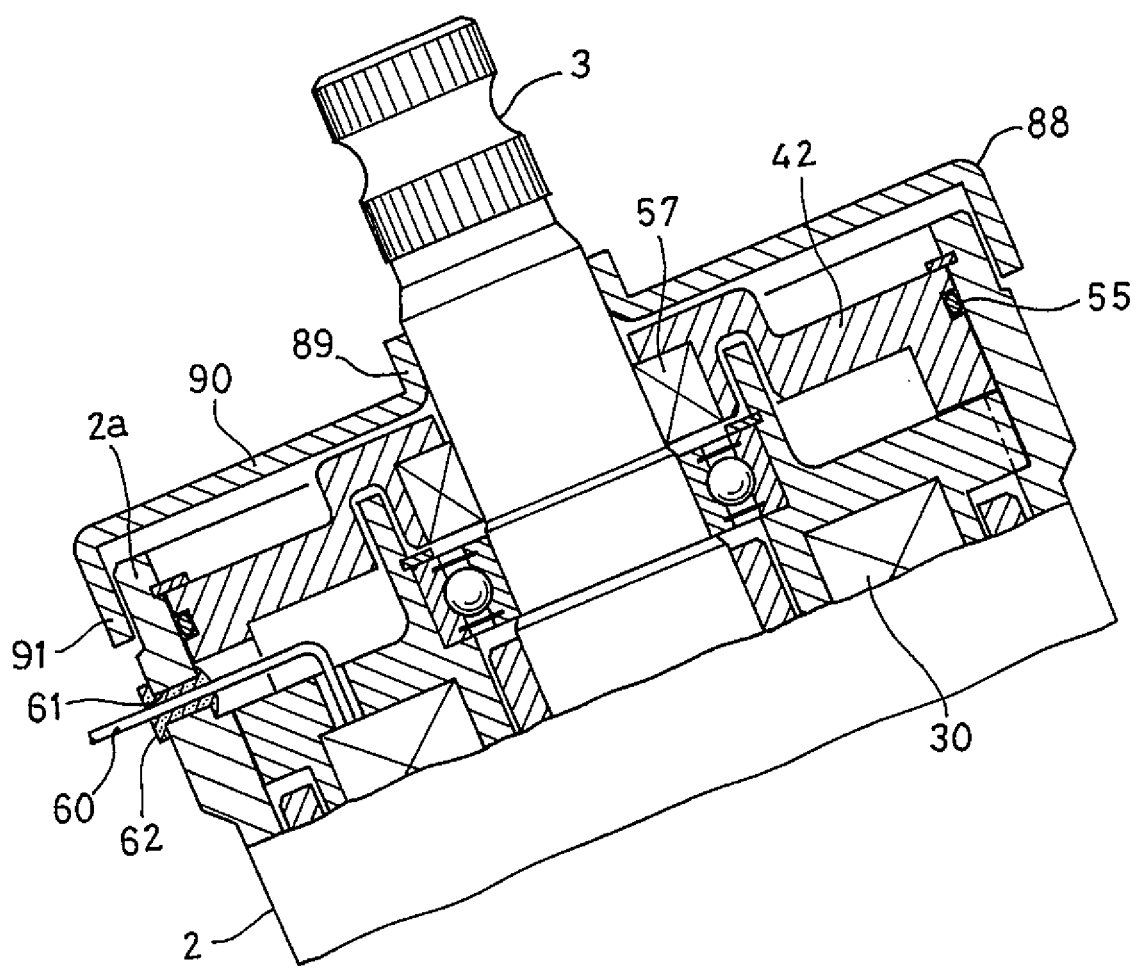
FIG. 16 is an enlarged sectional view illustrating the vicinity of upper end of the rotation transmission device of FIG. 15.

As illustrated in FIG. 16, a dust cover 88 is fixed to the input shaft 3 of the rotation transmission device 1. The dust cover 88 includes an inner tubular portion 89 fitted, with interference, to the outer periphery of the portion of the input shaft 3 protruding beyond the case 2; a flange portion 90 extending radially outwardly from one end of the inner tubular portion 89 to cover the open end of the large-diameter tubular portion 2a of the case 2; a cylindrical skirt portion 91 extending axially from the outer periphery of the flange portion 90 along the outer periphery of the large-diameter tubular portion 2a. A labyrinth gap is defined between the inner periphery of the skirt portion 91 and the outer periphery of the large-diameter tubular portion 2a. The labyrinth gap is a minute gap having a radial width of less than 1.0 mm (preferably 0.5 mm or less).

The large-diameter tubular portion 2a of the case 2 is formed with a through hole 61 through which a lead wire 60 that supplies electric power to the electromagnet 30 is inserted. A grommet 62 made of rubber is fitted in the through hole 61 so as to provide a seal between the inner periphery of the through hole 61 and the outer periphery of the lead wire 60. This grommet 62 has the same structure as that of the above embodiment.

Figure 17:
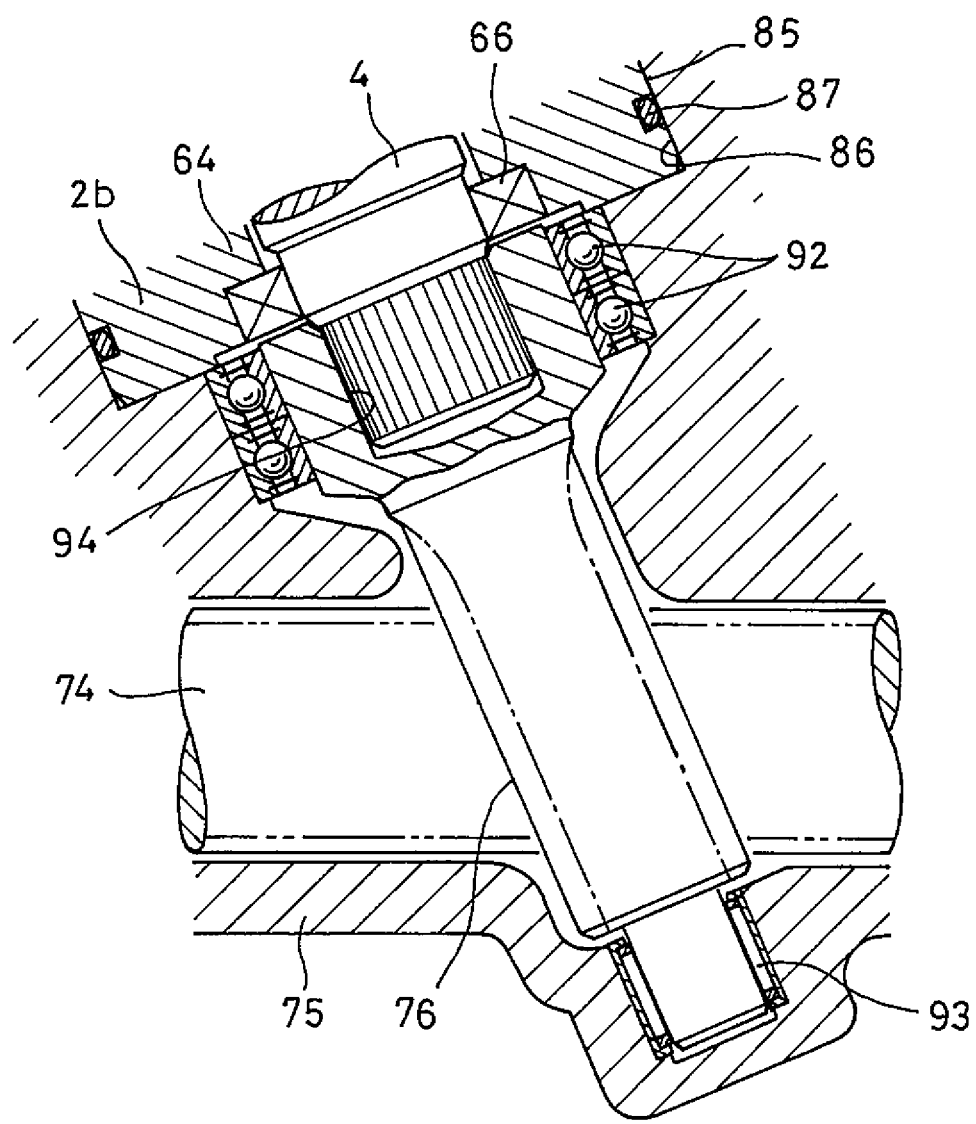
FIG. 17 is an enlarged sectional view illustrating the vicinity of the lower end of the rotation transmission device of FIG. 15.

As illustrated in FIG. 17, the pinion 76 is rotatably supported by a first pinion support bearing 92 and a second pinion support bearing 93 both mounted in the rack housing 75. In the shown example, a double-row deep groove ball bearing is used as the first pinion support bearing 92, and a needle roller bearing is used as the second pinion support bearing 93. The first and second pinion support bearings 92 and 93 support the pinion 76 on both sides thereof between which the portion of the pinion 76 meshing with the rack 74 is located. More specifically, the first pinion support bearing 92 supports the pinion 76 on the side thereof that is closer to the rotation transmission device 1 than is the portion of the pinion 76 meshing with the rack 74, and the second pinion support bearing 93 supports the pinion 76 on the side thereof that is remoter from the rotation transmission device 1 than is the portion of the pinion 76 meshing with the rack 74. The first pinion support bearing 92 is fixed in position by being axially sandwiched between the rack housing 75 and the small-diameter tubular portion 2b of the case 2.

An anti-rotation fitting portion 94 is disposed between the output shaft 4 of the rotation transmission device 1 and the pinion 76 such that the case 2 is detachable from the rack housing 75 by separating the output shaft 4 from the pinion 76, and such that, with the case 2 attached to the rack housing 75, the output shaft 4 is rotatable in unison with the pinion 76. While the anti-rotation fitting portion 94 may be constituted by e.g., a key and a key groove, if the anti-rotation fitting portion 94 is constituted by a spline shaft portion and a spline hole which mesh with each other as in the shown example, it is possible to easily connect the output shaft 4 and the pinion 76 to each other. While, in the shown example, the output shaft 4 includes the spline shaft portion and the pinion 76 has the spline hole, this arrangement of the spline shaft portion and the spline hole may be reversed.

In the steering device for a vehicle of the embodiment shown in FIG. 14, during normal traveling of the vehicle, the rotation transmission device 1 is used in an idling state, in which, by keeping the electromagnet 30 (see FIG. 15) of the rotation transmission device 1 energized, rotation is not transmitted from the input shaft 3 to the output shaft 4. At this time, the steering angle of the steering wheel 77 is detected by the steering angle sensor mounted in the reaction force motor 82, and the steering motor 81 is activated such that the steered angles of the steered wheels 73 change corresponding to the steering angle of the steering wheel 77. On the other hand, if an abnormality such as loss of power supply occurs, since the electromagnet 30 (see FIG. 15) of the rotation transmission device 1 is de-energized, the rotation transmission device 1 engages, and rotation is transmitted from the input shaft 3 to the output shaft 4. In this state, the operation of the steering wheel 77 is mechanically transmitted to the pinion 76 (see FIG. 15) via the first the steering shaft 78 and then the rotation transmission device 1, thereby making it possible to change the steered angles of the steered wheels 73.

Figure 18:
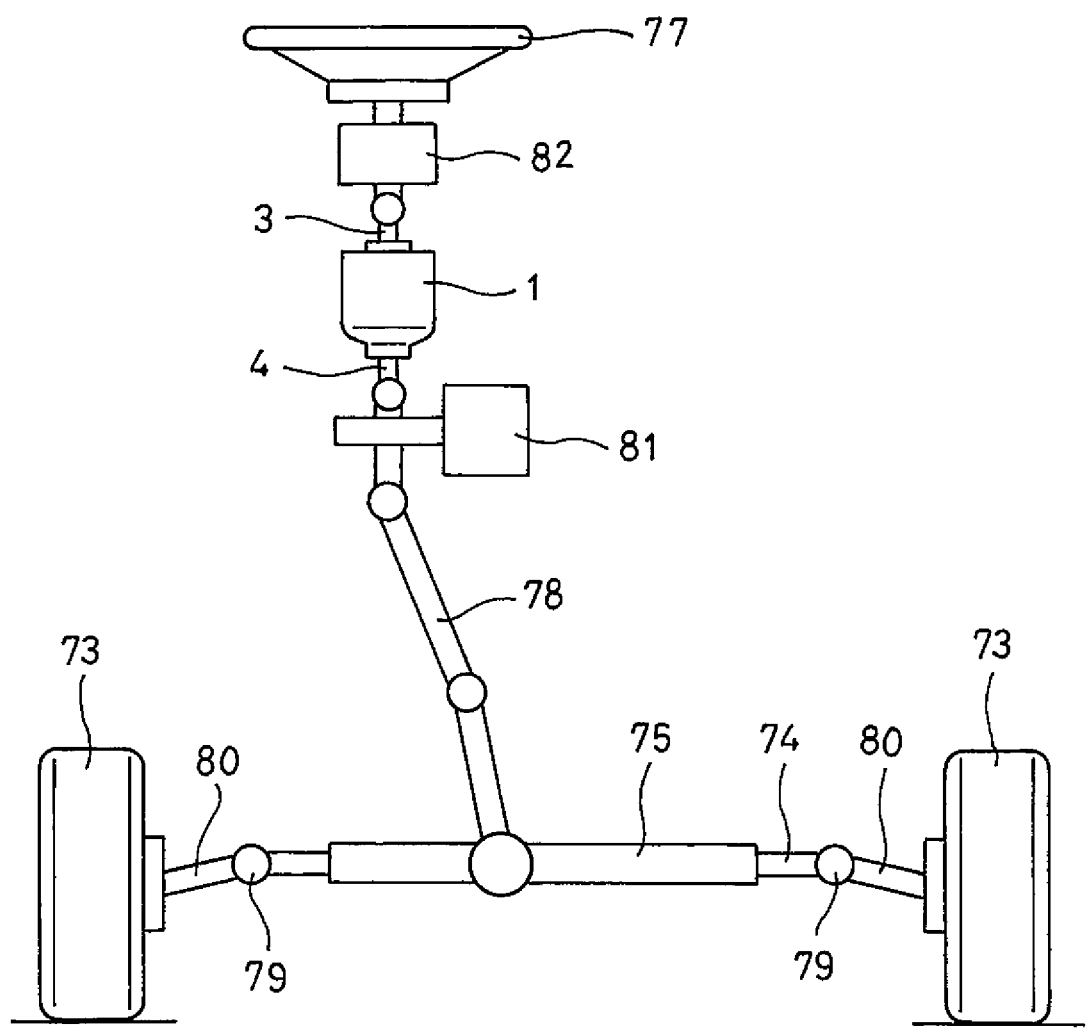
FIG. 18 shows a steering device for a vehicle according to a reference example.

When mounting a rotation transmission device to an automobile, the device is conventionally often mounted, as shown in FIG. 18, at a location where foreign matter such as muddy water is less likely to adhere (central position of the steering shaft 78, which transmits steering force from the steering wheel 77 to the rack 74 for vehicle steering). In FIG. 18, from the steering wheel 77 toward the rack housing 75, the reaction force motor 82, the rotation transmission device, and the steering motor 81 are mounted, in this order, to the steering shaft 78.

In contrast, in the steering device for a vehicle of the embodiment shown in FIG. 14, the rotation transmission device 1 is directly mounted at a location where foreign matter such as muddy water may adhere (specifically, mounted to the rack housing 75, in which the rack 74 for vehicle steering is received; the rack housing 75 is exposed to the underside of the vehicle). In this case, it is necessary to prevent foreign matter such as muddy water from entering the rotation transmission device 1.

The steering device for a vehicle of this embodiment overcomes this problem as follows. Specifically, as illustrated in FIGS. 15 and 16, when the rotation transmission device 1 is mounted to the steering device such that the large-diameter tubular portion 2a of the case 2 is located on the upper side, and the small-diameter tubular portion 2b of the case 2 is located on the lower side, the upper surface of the cover member 42 fitted to the open end of the large-diameter tubular portion 2a of the case 2 is covered by the dust cover 88. Therefore, it is possible to prevent foreign matter such as muddy water from accumulating near the outer seal member (O-ring 55) on the outer periphery of the cover member 42, and the inner seal member (oil seal 57) on the inner periphery of the cover member 42, and thus to more effectively prevent foreign matter from entering the rotation transmission device 1.

Also, since, as illustrated in FIG. 16, the cover member 42, the O-ring 55 and the oil seal 57 provide a seal of the rotation transmission device between the inner periphery of the open end of the large-diameter tubular portion 2a of the case 2 and the outer periphery of the input shaft 3, even if the device is used in an environment where foreign matter such as muddy water may adhere to the device, it is possible to prevent such foreign matter from entering the rotation transmission device 1.

The pinion 76 may be formed directly on the output shaft 4 of the rotation transmission device 1. However, the above-described steering device, of which the pinion 76 and the output shaft 4 of the rotation transmission device 1 are formed separately from each other, can be assembled more easily, because it can be assembled by first separately assembling the rack housing 75, the rack 74 and the pinion 76, then assembling the components of the rotation transmission device 1, and finally mounting the rotation transmission device 1 to the rack housing 75.

Also, since, in this steering device, the rack housing 75 has a cylindrical positioning fitting surface 86 to which the cylindrical surface 85 on the outer periphery of the small-diameter tubular portion 2b of the case 2 is fitted, when mounting the rotation transmission device 1 to the rack housing 75, it is possible to easily prevent the displacement of the center axes of the pinion 76 and the output shaft 4.

Also, since this steering device includes an O-ring 87 for sealing between the cylindrical surface 85 on the outer periphery of the small-diameter tubular portion 2b and the positioning fitting surface 86, after mounting the rotation transmission device 1 to the rack housing 75, it is possible to effectively prevent foreign matter such as muddy water from entering the rack housing 75 through a gap between the rack housing 75 and the small-diameter tubular portion 2b of the case 2 of the rotation transmission device 1.

Also, since this steering device includes first and second pinion support bearings 92 and 93 supporting the pinion 76 on both sides thereof between which the portion of the pinion 76 meshing with the rack 74 is located, the pinion 76 is stably supported, and thus meshes with the rack 74 with high accuracy.

Also, since, in this steering device, the first pinion support bearing 92 is fixed in position by being axially sandwiched between the rack housing 75 and the small-diameter tubular portion 2b of the case 2 of the rotation transmission device 1, any axial movement of the first pinion support bearing is prevented, and thus the pinion 76 meshes with the rack 74 with higher accuracy.

While, in the above embodiment, rollers 7a and 7b are used as the engagement elements disposed between the inner periphery of the outer ring 6 and the outer periphery of the inner ring 5, the present invention can be also applied to a rotation transmission device 1 in which balls or sprags are used as such engagement elements.

The above-described embodiments are mere examples in every respect, and the present invention is not limited thereto. Therefore, the scope of the present invention is indicated not by the above description but by the claims, and should be understood to include all modifications within the scope and meaning equivalent to the scope of the claims.

DESCRIPTION OF REFERENCE NUMERALS

1: Rotation transmission device
2: Case
2a: Large-diameter tubular portion
2b: Small-diameter tubular portion
2c: Coupling portion
3: Input shaft
4: Output shaft
5: Inner ring
6: Outer ring
7a, 7b: Roller
8: Roller cage
30: Electromagnet
31: Armature
33: Ball ramp mechanism
40: Field core
41: Solenoid coil
42: Cover member
53: Input shaft bearing
55: O-ring
57: Oil seal
58: Metal core
59: Seal lip
60: Lead wire
61: Through hole
62: Grommet 63: Output shaft bearing
66: Output shaft seal member
71: Bearing fitting surface
73: Steered wheel
74: Rack
75: Rack housing
76: Pinion
85: Cylindrical surface
86: Positioning fitting surface
87: O-ring
88: Dust cover
89: Inner tubular portion
90: Flange portion
91: Skirt portion
92: First pinion support bearing
93: Second pinion support bearing
94: Anti-rotation fitting portion

The invention claimed is:

1. A rotation transmission device comprising:
a tubular case including, as a seamless integral member;
a cylindrical large-diameter tubular portion,
a cylindrical small-diameter tubular portion having an inner diameter smaller than an inner dimeter of the large-diameter tubular portion, and
a coupling portion coupling the large-dimeter tubular portion and the small-diameter tubular portion to each other;
wherein one of two opposite ends of the large-diameter tubular portion remote from the small-diameter tubular portion is an open end, and one of two opposite ends of the small-diameter tubular portion remote from the large-diameter tubular portion is an open end,
an input shaft having one end thereof received in the case, and the other end thereof protruding beyond the open end of the large-diameter tubular portion of the case;
an output shaft aligned with the input shaft in a straight line, with one end of the output shaft received in the case, and the other end of the output shaft protruding beyond the open end of the small-diameter tubular portion of the case;
an inner ring disposed on a portion of the input shaft received in the case so as to rotate in unison with the input shaft;
an annular outer ring connected to a portion of the output shaft received in the case so as to rotate in unison with the output shaft, such that the annular outer ring surrounds the inner ring;
engagement elements disposed between an inner periphery of the outer ring and an outer periphery of the inner ring;
an engagement element cage supported for movement between an engaged position where the engagement elements are engaged with the outer ring and the inner ring and a disengaged position where the engagement elements are disengaged therefrom;
an annular electromagnet mounted between an inner periphery of the large-diameter tubular portion and an outer periphery of the input shaft;
an armature supported to axially move when the electromagnet is energized;
a motion converting mechanism configured to convert axial movement of the armature into a motion of the engagement element cage from one position of the engaged position and the disengaged position to the other position;
an input shaft bearing rotatably supporting the input shaft;
an output shaft bearing rotatably supporting the input shaft;
an output shaft seal member providing a seal between an outer periphery of the output shaft and an inner periphery of the open end of the small-diameter tubular portion;
an annular cover member made of aluminum, and fitted to an inner periphery of the open end of the large-diameter tubular portion so as to be axially opposed to the electromagnet;
an outer seal member providing a seal between an outer periphery of the cover member and the inner periphery of the large-diameter tubular portion; and
an inner seal member providing a seal between an inner periphery of the cover member and the outer periphery of the input shaft.

2. The rotation transmission device according to claim 1, wherein the electromagnet includes:
an annular field core made of a magnetic material, and fitted to the inner periphery of the large-diameter tubular portion; and
a solenoid coil wound around the field core,
wherein the cover member is mounted to axially abut against the field core, and
wherein the input shaft bearing is mounted to the inner periphery of the cover member so as to be kept out of contact with the field core.

3. The rotation transmission device according to claim 2, wherein the cover member has, on the inner periphery thereof, a cylindrical bearing fitting surface to which the input shaft bearing is fitted, and
wherein the input shaft is kept out of contact with the field core by setting an axial length of the bearing fitting surface larger than an axial width of the input shaft bearing.

4. The rotation transmission device according to claim 3, further comprising a dust cover including:
an inner tubular portion fitted, with interference, to an outer periphery of a portion of the input shaft protruding beyond the case;
a flange portion extending radially outwardly from one end of the inner tubular portion, and covering the open end of the large-diameter tubular portion of the case; and
a cylindrical skirt portion extending axially from an outer periphery of the flange portion along an outer periphery of the large-diameter tubular portion.

5. The rotation transmission device according to claim 2, further comprising a dust cover including:
an inner tubular portion fitted, with interference, to an outer periphery of a portion of the input shaft protruding beyond the case;
a flange portion extending radially outwardly from one end of the inner tubular portion, and covering the open end of the large-diameter tubular portion of the case; and
a cylindrical skirt portion extending axially from an outer periphery of the flange portion along an outer periphery of the large-diameter tubular portion.

6. The rotation transmission device according to claim 1, wherein the inner seal member is an oil seal including:
an annular metal core comprising a metal plate; and
a seal lip made of rubber, and bonded to the metal core, and
wherein the seal lip is in sliding contact with the outer periphery of the input shaft.

7. The rotation transmission device according to claim 6, further comprising a dust cover including:
- an inner tubular portion fitted, with interference, to an outer periphery of a portion of the input shaft protruding beyond the case;
- a flange portion extending radially outwardly from one end of the inner tubular portion, and covering the open end of the large-diameter tubular portion of the case; and
- a cylindrical skirt portion extending axially from an outer periphery of the flange portion along an outer periphery of the large-diameter tubular portion.

8. The rotation transmission device according to claim 1, wherein the outer seal member is an O-ring made of rubber.

9. The rotation transmission device according to claim 8, further comprising a dust cover including:
- an inner tubular portion fitted, with interference, to an outer periphery of a portion of the input shaft protruding beyond the case;
- a flange portion extending radially outwardly from one end of the inner tubular portion, and covering the open end of the large-diameter tubular portion of the case; and
- a cylindrical skirt portion extending axially from an outer periphery of the flange portion along an outer periphery of the large-diameter tubular portion.

10. The rotation transmission device according to claim 1, wherein one of the cover member and the large-diameter tubular portion has a through hole through which a lead wire configured to supply electric power to the electromagnet is inserted, and
wherein a grommet made of rubber is fitted in the through hole so as to provide a seal between an inner periphery of the through hole and an outer periphery of the lead wire.

11. The rotation transmission device according to claim 10, further comprising a dust cover including:
- an inner tubular portion fitted, with interference, to an outer periphery of a portion of the input shaft protruding beyond the case;
- a flange portion extending radially outwardly from one end of the inner tubular portion, and covering the open end of the large-diameter tubular portion of the case; and
- a cylindrical skirt portion extending axially from an outer periphery of the flange portion along an outer periphery of the large-diameter tubular portion.

12. The rotation transmission device according to claim 1, further comprising a dust cover including:
- an inner tubular portion fitted, with interference, to an outer periphery of a portion of the input shaft protruding beyond the case;
- a flange portion extending radially outwardly from one end of the inner tubular portion, and covering the open end of the large-diameter tubular portion of the case; and
- a cylindrical skirt portion extending axially from an outer periphery of the flange portion along an outer periphery of the large-diameter tubular portion.

13. A steering device for a vehicle, the steering device comprising:
- a rack supported to be movable in left and right directions, and having both ends thereof connected to a pair of steered wheels, respectively, such that directions of the steered wheels change as the rack moves either to the left or to the right;
- a rack housing in which the rack is movably received;
- a pinion meshing with the rack; and
- the rotation transmission device according to claim 1,
- wherein the case of the rotation transmission device is detachably fixed to the rack housing,
- wherein the pinion is rotatably supported by at least one pinion support bearing mounted in the rack housing, and
- wherein an anti-rotation fitting portion is disposed between the output shaft of the rotation transmission device and the pinion such that the case is detachable from the rack housing by separating the output shaft from the pinion, and such that, with the case attached to the rack housing, the output shaft is rotatable in unison with the pinion.

14. The steering device according to claim 13, wherein the rack housing has a cylindrical positioning fitting surface to which a cylindrical surface formed on an outer periphery of the small-diameter tubular portion of the case is fitted.

15. The steering device according to claim 14, further comprising an O-ring providing a seal between the positioning fitting surface and the cylindrical surface on the outer periphery of the small-diameter tubular portion.

16. The steering device according to claim 13, wherein the at least one pinion support bearing comprises a plurality of pinion support bearings mounted to the rack housing, with at least one of the plurality of pinion support bearings located on each of two sides of the pinion between which a meshing portion of the pinion meshing with the rack is located, so as to support the pinion on the two sides.

17. The steering device according to claim 16, wherein, the at least one of the plurality of pinion support bearings located on one of the two sides closer to the rotation transmission device than is the meshing portion of the pinion is fixed in position by being axially sandwiched between the rack housing and the small-diameter tubular portion of the case of the rotation transmission device.

* * * * *